US012666213B2

(12) United States Patent
Brown et al.

(10) Patent No.: US 12,666,213 B2
(45) Date of Patent: Jun. 23, 2026

(54) METHOD OF PROCESSING AUDIO FOR PLAYBACK OF IMMERSIVE AUDIO

(71) Applicant: DOLBY LABORATORIES LICENSING CORPORATION, San Francisco, CA (US)

(72) Inventors: C. Phillip Brown, Castro Valley, CA (US); Michael J. Smithers, Kareela (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 174 days.

(21) Appl. No.: 18/291,144

(22) PCT Filed: Jul. 21, 2022

(86) PCT No.: PCT/US2022/037809

§ 371 (c)(1),
(2) Date: Jan. 22, 2024

(87) PCT Pub. No.: WO2023/009377

PCT Pub. Date: Feb. 2, 2023

(65) Prior Publication Data

US 2024/0373184 A1 Nov. 7, 2024

Related U.S. Application Data

(60) Provisional application No. 63/226,529, filed on Jul. 28, 2021.

(30) Foreign Application Priority Data

Jul. 28, 2021 (EP) .................................... 21188202

(51) Int. Cl.

| | |
|---|---|
| ***H04S 3/00*** | (2006.01) |
| ***H04S 1/00*** | (2006.01) |

(52) U.S. Cl.

CPC .......... *H04S 3/008* (2013.01); *H04R 2400/01* (2013.01); *H04R 2400/03* (2013.01);

(Continued)

(58) Field of Classification Search

CPC ...... H04S 3/008; H04S 1/007; H04S 2400/07; H04R 2400/01; H04R 2400/03; H04R 2499/13

See application file for complete search history.

(56) References Cited

U.S. PATENT DOCUMENTS 7,242,782 B1 * 7/2007 Kasai ...................... H04S 1/007 381/1
10,284,995 B2 5/2019 Lars-Johan (Continued)

FOREIGN PATENT DOCUMENTS

EP 1280377 A1 1/2003
EP 1994795 B1 7/2010

(Continued)

OTHER PUBLICATIONS https://www.dirac.com.cn/how-to-obtain-a-good-stereo-sound-stage-in-car/, retrieved on Apr. 28, 2024, 12 pages.

(Continued)

*Primary Examiner* — Carolyn R Edwards
*Assistant Examiner* — Kuassi A Ganmavo

(57) ABSTRACT

A method (200) of processing audio in an immersive audio format comprising at least one height audio channel, comprising: obtaining (250) two height audio signals from at least a portion of the at least one height audio channel: modifying (270) a relative phase between the two height audio signals in frequency bands in which phase differences are predominantly out of phase to obtain two phase modified height audio signals: and playing back (290) the processed audio comprising the two phase modified height audio (Continued)

signals with at least two audio loudspeakers. The phase differences occur as a result of having monaural signals emanated from two audio loudspeakers at one or more listening positions symmetrically off-center with respect to the at least two loudspeakers, laterally spaced with respect to each of said one or more listening positions. The method allows perception of sound height/elevation without using overhead speakers.

19 Claims, 18 Drawing Sheets

(52) U.S. Cl.
CPC .......... *H04R 2499/13* (2013.01); *H04S 1/007* (2013.01); *H04S 2400/07* (2013.01)

(56) References Cited

U.S. PATENT DOCUMENTS

| | | | | |
|---|---|---|---|---|
| 10,313,819 | B1 | 6/2019 | Dublin | |
| 2004/0109575 | A1 | 6/2004 | Thigpen | |
| 2006/0188101 | A1* | 8/2006 | Gunnarsson | H04S 1/002 381/1 |
| 2010/0303246 | A1* | 12/2010 | Walsh | H04S 3/00 381/18 |
| 2011/0081024 | A1 | 4/2011 | Soulodre | |
| 2012/0008789 | A1* | 1/2012 | Kim | H04S 5/00 381/17 |
| 2012/0213375 | A1* | 8/2012 | Mahabub | H04S 5/00 381/17 |
| 2014/0112480 | A1* | 4/2014 | Audfray | H04S 7/00 381/17 |
| 2014/0198933 | A1 | 7/2014 | Totsuka | |
| 2015/0181339 | A1* | 6/2015 | Chabanne | H04R 5/04 381/300 |
| 2015/0350804 | A1 | 12/2015 | Crockett | |
| 2016/0044434 | A1* | 2/2016 | Chon | H04S 7/302 381/18 |
| 2017/0070837 | A1 | 3/2017 | De Poortere | |
| 2017/0188169 | A1* | 6/2017 | Chon | H04S 7/30 |
| 2017/0325043 | A1* | 11/2017 | Jot | H04S 3/002 |
| 2017/0347219 | A1* | 11/2017 | McCauley | G06F 3/04815 |
| 2017/0374484 | A1* | 12/2017 | Lando | G10L 19/008 |
| 2018/0007466 | A1 | 1/2018 | Hess | |
| 2018/0014138 | A1 | 1/2018 | Hess | |
| 2018/0227695 | A1 | 8/2018 | Groh | |
| 2018/0279065 | A1 | 9/2018 | Celestinos | |
| 2018/0317037 | A1* | 11/2018 | Brännmark | H04S 7/303 |
| 2018/0338204 | A1 | 11/2018 | Winton | |
| 2020/0213800 | A1* | 7/2020 | Jot | H04S 7/302 |
| 2020/0396557 | A1* | 12/2020 | Herre | H04S 7/302 |
| 2021/0120357 | A1 | 4/2021 | Dublin | |
| 2022/0150653 | A1* | 5/2022 | Zheng | H04R 3/14 |

FOREIGN PATENT DOCUMENTS

| | | | |
|---|---|---|---|
| WO | 2013171825 | A1 | 11/2013 |
| WO | 2017063688 | A1 | 4/2017 |

OTHER PUBLICATIONS

H. Lee, "Phantom Image Elevation Explained," Journal of the Audio Engineering Society (Sep. 2016), 10 page.

V. Ralph Algazi et al. "Elevation Localization and Head-related Transfer Function Analysis at Low Frequencies", The Journal of the Acoustical Society of America, American Institute of Physics, 2 Huntington Quadrangle, Melville, NY 11747, vol. 109, No. 3, Mar. 1, 2001 (Mar. 1, 2001), pp. 1110-1122. 13 pages.

* cited by examiner

METHOD OF PROCESSING AUDIO FOR PLAYBACK OF IMMERSIVE AUDIO

CROSS-REFERENCE TO RELATED APPLICATIONS

This application is the U.S. national stage entry of International Patent Application No. PCT/US2022/037809, filed Jul. 21, 2022, which claims priority of U.S. Provisional Application No. 63/226,529 filed Jul. 28, 2021 and European Patent Application No. 21188202.2 filed Jul. 28, 2021, each of which is hereby incorporated by reference in its entirety.

TECHNICAL FIELD

This disclosure relates to the field of audio processing. In particular, the disclosure relates to a method of processing audio in an immersive audio format for playback the processed audio with a non-immersive loudspeaker system. The disclosure further relates to an apparatus comprising a processor configured to carry out the method, to a vehicle comprising the apparatus, to a program and a computer-readable storage medium.

BACKGROUND

Vehicles usually contain loudspeaker systems for audio playback. Loudspeaker systems in vehicles may be used to playback audio from, for example, tapes, CDs, audio streaming services or applications executed in an automotive entertainment system of the vehicle or remotely via a device connected to the vehicle. The device may be, e.g., a portable device connected to the vehicle wirelessly or with a cable. For example, most recently, streaming services such as Spotify and Tidal have been integrated into the automotive entertainment system, either directly in the vehicle's hardware (usually known as the "head unit") or via a smart phone using Bluetooth or Apple CarPlay or Android Auto. The loudspeaker systems in vehicles may also be used to playback terrestrial and/or satellite radio. Conventional loudspeaker systems for vehicles are stereo loudspeakers systems. Stereo loudspeaker systems may include a total of four loudspeakers: a front pair of loudspeakers and a rear pair of loudspeakers, for the front and rear passengers, respectively. However, in more recent years, with the introduction of DVD players in vehicles, surround loudspeaker systems have been introduced in vehicles to support playback of DVD audio format. FIG. 1 shows an interior view of a vehicle 100. Vehicle 100 includes a surround loudspeaker system including loudspeakers 10, 11, 30, 31, 41, 42 and 43. The loudspeakers are only shown for the left side of vehicle 100. Corresponding loudspeakers may be arranged symmetrically on the right side of vehicle 100. In particular, the surround loudspeaker system of FIG. 1 includes: pairs of tweeter loudspeakers 41, 42 and 43, a pair of full range front loudspeaker 30 and rear loudspeaker 31, a central loudspeaker 10 and a Low Frequency Effect loudspeaker or Subwoofer 11. Tweeter loudspeaker 41 is placed close to a dashboard of the vehicle. Tweeter loudspeaker 42 is placed low on a front side pillar of vehicle 100. However, tweeter loudspeakers 41, 42, 43 but also full range front and rear loudspeakers 30 and 31 may be placed in any position suitable for the specific implementation.

Immersive audio is becoming mainstream in cinemas or homes listening environments. With immersive audio becoming mainstream in the cinema or the home, it is natural to assume that immersive audio will be played back also inside vehicles. Dolby Atmos Music is already available via various streaming services. Immersive audio is often differentiated from surround audio format by the inclusion of an overhead or height audio channel. Therefore, for playing back immersive audio, overhead or height loudspeakers are used. While high end vehicles may contain such overhead or height loudspeakers, most of the conventional vehicles still use a stereo loudspeaker system or a more advanced surround loudspeaker system as shown in FIG. 1. In fact, height loudspeakers dramatically increase complexity of the loudspeaker system in the vehicles. The height loudspeaker needs to be placed on a roof of the vehicle which is usually not adapted for this purpose. For example, vehicles have usually a low roof which limits the available height for placement of height loudspeaker. Furthermore, vehicles are often sold with the option to mount sunroof to uncover a window in the vehicle's roof, making a difficult industrial design challenge to integrate or place height loudspeakers in the roof. Additional audio cables may also be required for such height loudspeakers. For all these reasons, integration of height loudspeakers in vehicles may be costly due to space and industrial design constraints.

SUMMARY

It would be advantageous to playback immersive audio content in a non-immersive loudspeaker system, for example a stereo loudspeaker system or a surround loudspeaker system. In the context of the present disclosure a "non-immersive loudspeaker system" is a loudspeaker/speaker system that comprises at least two loudspeakers but no overhead loudspeaker (i.e. no height speaker).

It would be advantageous to create a perception of sound height by playing back immersive audio content into non-immersive loudspeaker systems such that the user's audio experience is enhanced even without the use of overhead loudspeakers.

An aspect of this disclosure provides a method of processing audio in an immersive audio format comprising at least one height audio channel, for playing back the processed audio with a non-immersive loudspeaker system of at least two audio loudspeakers in a listening environment including one or more listening positions. Each of the one or more listening positions is symmetrically off-center with respect to the at least two loudspeakers. Each of the at least two loudspeakers is laterally spaced with respect to each of said one or more listening positions such that, when two monaural audio signals are emanated from the at least two loudspeakers, phase differences (e.g. Inter-loudspeaker differential phases, IDPs) occur at the one or more listening positions as a result of acoustic characteristics of the listening environment. The method comprises obtaining two (monaural/identical) height audio signals from at least a portion of the at least one height audio channel; modifying a relative phase between the two height audio signals in frequency bands in which the phase differences (e.g., IDPs occurring at the one or more listening positions when the two height channels are emanated from the at least two loudspeakers) are (predominantly) out of phase to obtain two phase modified height audio signals in which the phase differences are (predominantly) in-phase; and playing back the processed audio at the at least two audio loudspeakers, wherein the processed audio comprises the two phase modified height audio signals.

For a listening position symmetrically off-center with respect to at least two loudspeakers, two monaural audio signals emanated from the at least two loudspeakers are perceived at the listening position with a delay in the time domain. This delay corresponds in the frequency domain to phase differences of the two monaural signals varying with frequency at the listening position.

According to a psychoacoustic phenomenon investigated by the inventors, an audio source emanated by the two loudspeakers may be perceived with sound height when the listening position is centered with respect to the two loudspeakers and when the two loudspeakers are laterally spaced with respect to the listening position. The more the two loudspeakers are laterally spaced with respect to the centered listening position, the more sound height, i.e. more elevation in the sound, is perceived at the listening position.

Advantageously, for two loudspeakers laterally spaced with respect to each of said one or more listening position perception, sound height is created by centering the height channel with respect to the two loudspeakers. Centering the height channel is performed by obtaining two height audio signals from at least a portion of the at least one height audio channel and modifying a relative phase between the two height audio signals in frequency bands in which the phase differences are (predominantly) out of phase to obtain two phase modified height audio signals in which the phase differences are (predominantly) in-phase. The processed audio signal played back at the two loudspeakers comprises the two phase modified height audio signals. The two phase modified height audio signals provide the "centered" height audio channel. Since the processed audio signal comprises the "centered" height audio signal, sound height is perceived by the listener(s) located at the one or more listening position. Advantageously, perception of sound height is created by playing back the processed audio into a non-immersive loudspeaker system, i.e. without using overhead loudspeakers.

In an embodiment, the audio in the immersive audio format further comprises at least two audio channels and the method further comprises mixing each of the two phase modified height audio signals with each (e.g., one) of the two audio channels.

In an embodiment, the audio in the immersive audio format further comprises a center channel and the method further comprises mixing each of the two phase modified height audio signals with the center channel.

In an embodiment, the audio in the immersive audio format has a single height audio channel, and obtaining the two height audio signals comprises obtaining two identical height audio signals both corresponding to the single height audio channel.

In an embodiment, the audio in the immersive audio format comprises at least two height audio channels and obtaining the two height audio signals comprises obtaining two identical height audio signals from the at least two height audio channels.

In an embodiment, the method further comprises applying mid/side processing to the at least two height audio channels to obtain a mid signal and a side signal. Each of the two height audio signals corresponds to the mid signal.

In an embodiment, the method further comprises mixing the side signal and a signal corresponding to the side signal but with opposite phase of the side signal with the phase modified height audio signals.

Another aspect of this disclosure provides an apparatus comprising a processor and a memory coupled to the processor, wherein the processor is configured to carry out any of methods described in the present disclosure.

Another aspect of this disclosure provides a vehicle comprising such apparatus.

Other aspects of the present disclosure provide a program comprising instructions that, when executed by a processor, cause the processor to carry out the method of processing audio and further a computer-readable storage medium storing such program.

BRIEF DESCRIPTION OF THE DRAWINGS

Embodiments of the present disclosure are illustrated by way of example, and not by way of limitation, in the accompanying drawings, wherein like reference numerals refer to similar elements, and in which.

DETAILED DESCRIPTION

Numerous specific details are described below to provide a thorough understanding of the present disclosure. However, the present disclosure may be practiced without these specific details. In addition, well-known parts may be described in less exhaustive detail. The figures are schematic and comprise parts relevant for understanding the present disclosure, whereas other parts may be omitted or merely suggested.

Figure 2:
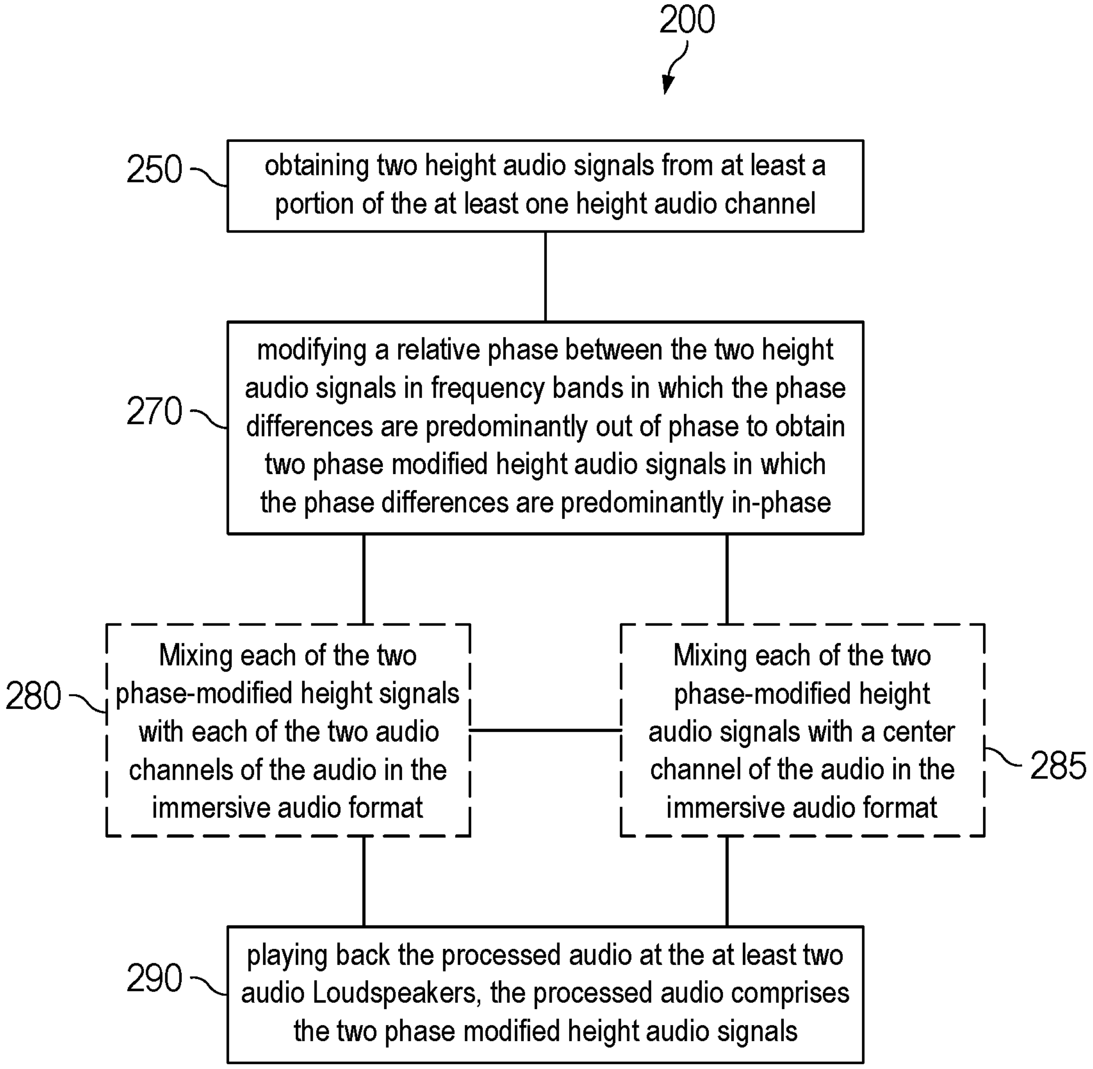
FIG. 2 is a flowchart illustrating an example of a method of processing audio in an immersive format according to an embodiment of the disclosure.

FIG. 2 shows a flowchart illustrating an example of a method 200 of processing audio in an immersive audio format according to an embodiment of the disclosure. Method 200 can be used to playback the processed audio with a non-immersive loudspeaker system of at least two audio loudspeakers in a listening environment. Listening environment may be an interior of a vehicle, e.g. a car. The listening environment may be an interior of any type of passenger or non-passenger vehicle, e.g. used for commercial purposes or to transport cargo. However, the listening environment is not limited to the interior of a vehicle. In general, as it will be shown in more details below, the present disclosure relates to any listening environment in which two loudspeakers of the non-immersive loudspeaker system are laterally spaced with respect to one or more listening positions and where the one or more listening positions are symmetrically off center with respect to the two loudspeakers. In particular, it has been found that, in vehicles, loudspeakers are arranged in a manner that generally satisfies these conditions.

Figure 1:
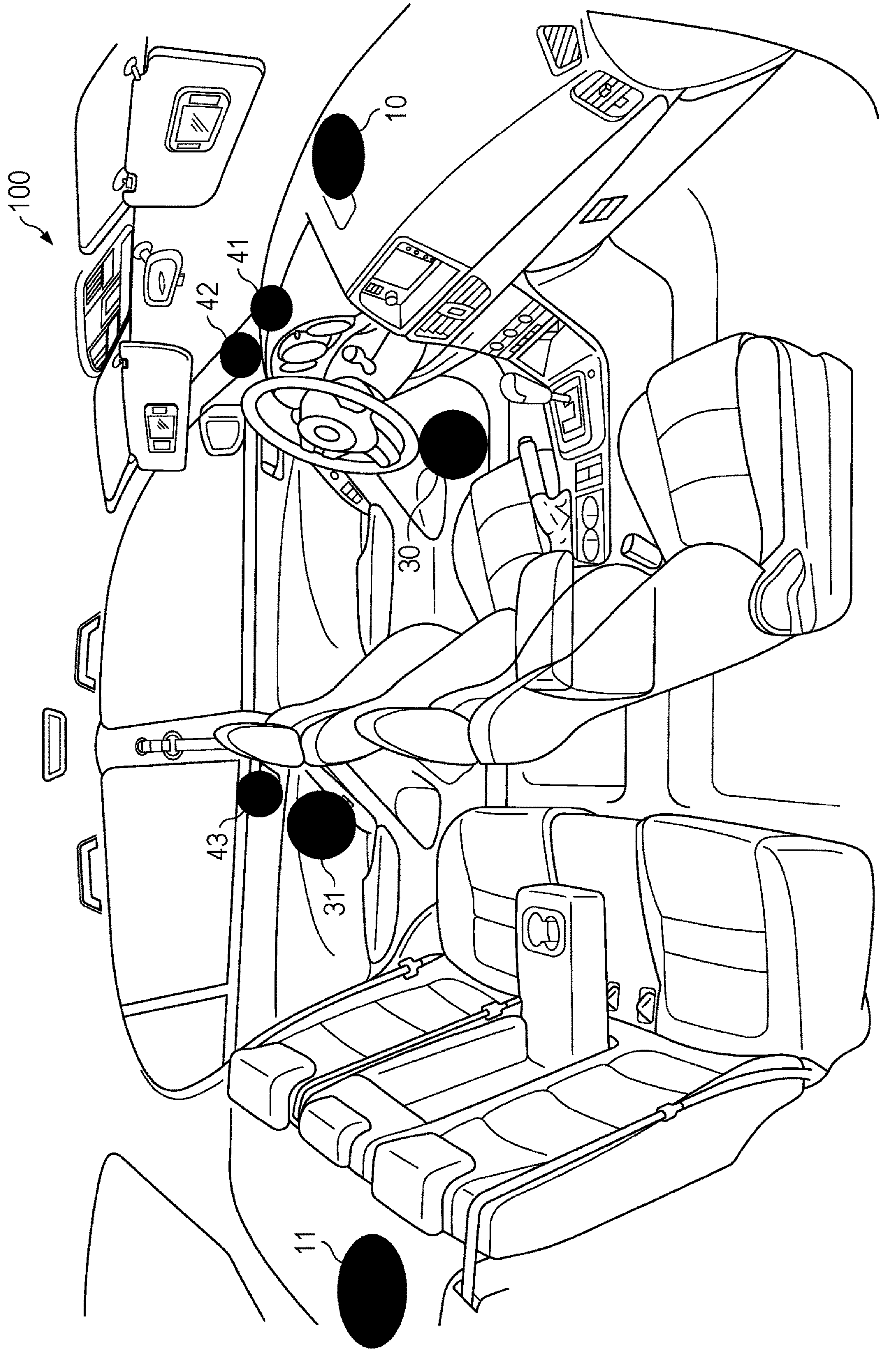
FIG. 1 schematically shows an interior view of a vehicle with a loudspeaker system arranged according to an embodiment of the disclosure.
Figure 3:
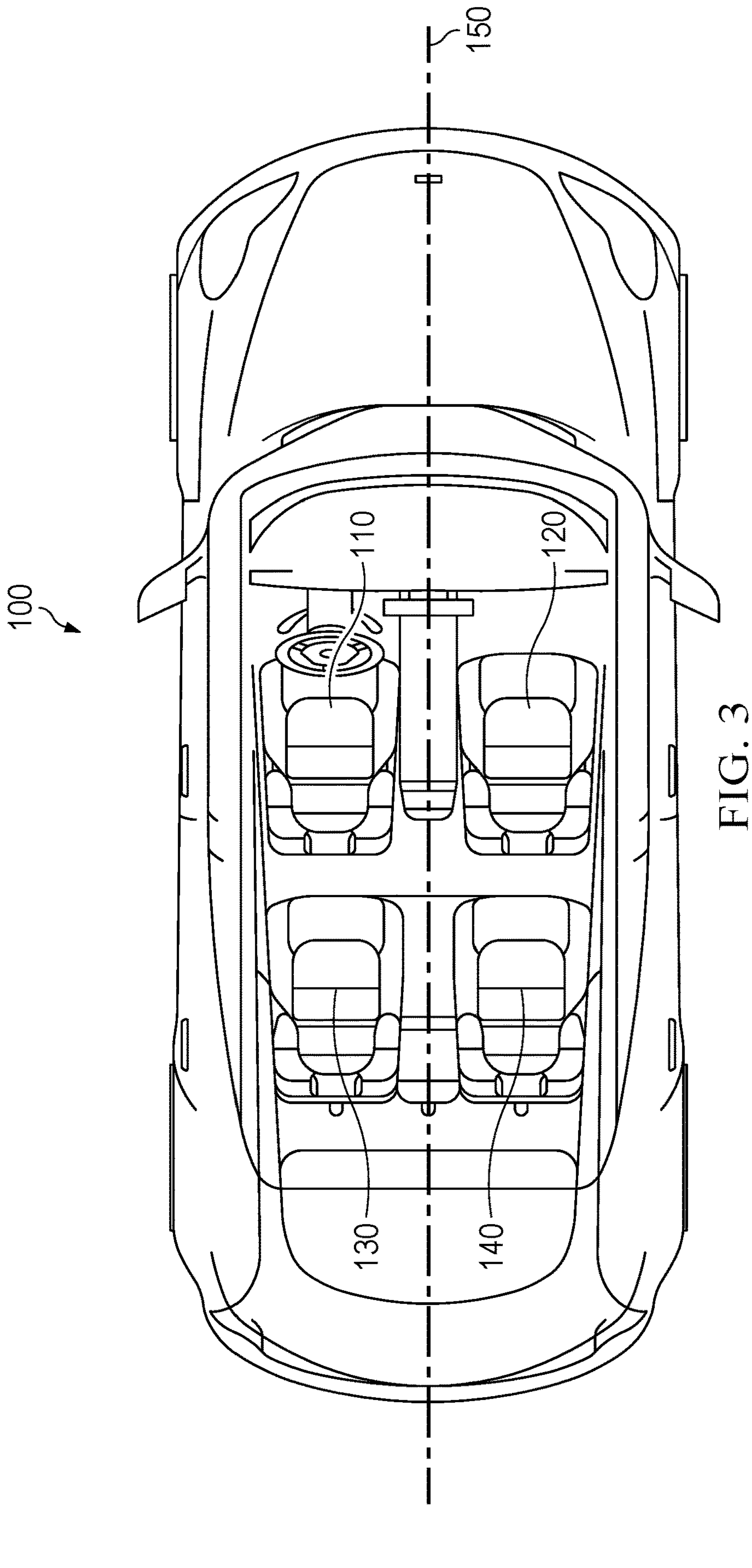

For example, with reference to FIG. 3, vehicle 100, in this example a four-passenger car, is schematically drawn. For simplicity, arrangement of the loudspeakers is not shown in FIG. 3, but it is shown in the more detailed interior view of vehicle 100 of FIG. 1. Passenger car 100 has four seats 110, 120, 130 and 140. When considering the loudspeaker system shown in FIG. 1, loudspeakers 30, 31, 41, 42, 43 will have corresponding loudspeakers (not shown in the Figures) arranged at the right-hand side of vehicle 100. With reference to FIG. 3, the loudspeakers at the left-hand side of vehicle 100 and their respective counterparts at the right-hand side of vehicle 100 are arranged reflective symmetrically with respect to a center axis 150, crossing a center of vehicle 100 along its length. It will be appreciated that each of seats 110, 120, 130 and 140 and thus, the potential listeners located thereof, are symmetrically off center with respect to any pair of loudspeakers comprising loudspeakers 30, 31, 41, 42, 43 and their respective counterparts at the right-hand side of vehicle. For example, a driver seating at driver seat 110 will be symmetrically off center between loudspeakers 30, 41, 42 and the corresponding right-hand side loudspeakers (not shown in the Figures). The driver will be closer to loudspeakers 30, 41 and 42 than to the corresponding loudspeakers at the right-hand side of vehicle 100. In FIG. 1 and FIG. 3, the driver's seat is shown at the left side (left with respect to a forward direction of driving) of vehicle 100. However, it is understood that location of the driver's seat in a vehicle can be different in different regions. For example, in UK, Australia or Japan, the driver's seat is located on a right side of the vehicle with respect to the forward direction of driving the vehicle.

The non-immersive loudspeaker system may be for example a stereo loudspeaker system or a surround loudspeaker system as shown with reference to FIG. 1.

In an embodiment the audio in the immersive audio format may be audio rendered in the immersive audio format.

The immersive audio format of (e.g. rendered) audio may comprise at least one height channel. In an embodiment, the immersive audio format may be a Dolby Atmos format. In an another embodiment, the immersive audio format may be a X.Y.Z audio format, where $X\geq 2$ is the number of front or surround audio channels, $Y\geq 0$ is, when present, a Low Frequency Effects or subwoofer audio channel, and $Z\geq 1$ is the at least one height audio channel. Loudspeaker system shown in FIG. 1 is a typical 5.1 loudspeaker system for playback of 5.1 audio with 5 front or surround loudspeakers, two left audio loudspeakers (e.g. left and left surround), two right audio loudspeakers (e.g. right and right surround), a center loudspeaker and one LFE loudspeaker. The two left audio loudspeakers correspond to loudspeakers 30, 31 (for mid-range or full range frequency), 41, 42 and 43 (for high-range frequency). The center loudspeaker corresponds to loudspeaker 10.

With reference to FIG. 2, method 200 comprises obtaining 250 two height audio signals from at least a portion of the at least one height audio channel. As explained above with reference to FIG. 1 and FIG. 3, in a vehicle, each of the one or more listening positions is symmetrically off center with respect to the at least a pair of two loudspeakers. Each loudspeaker of the pair of two loudspeakers is laterally spaced with respect to each of said one or more listening positions. When two monoaural signals are emanated from the two loudspeakers and the listening positions are symmetrically off center with respect to the two loudspeakers, phase differences occur at the one or more listening positions as a result of acoustic characteristics of the listening environment. The phase differences typically occur in a plurality of frequency bands in which the phase differences alternate between being predominantly in-phase and predominantly out of phase.

Method 200 further comprises modifying 270 a relative phase between the two height audio signals in frequency bands in which the phase differences are predominantly out of phase to obtain two phase modified height audio signals in which the phase differences are predominantly in-phase. Method 200 further comprises playing back 290 the processed audio at the at least two audio loudspeakers. The processed audio comprises the two phase modified height audio signals.

Figure 4A:
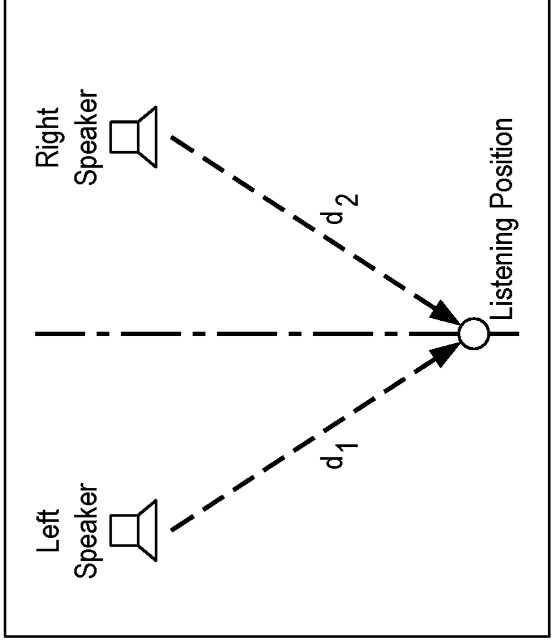
Figure 4B:
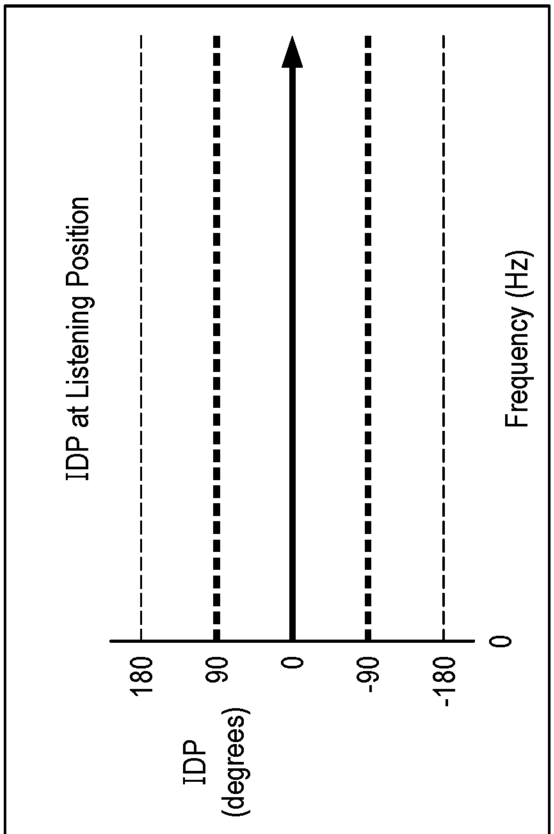

To explain further, we will make reference to FIGS. 4*a* and 4*b*. Temporal differences at a listening position are equivalent to a phase difference that varies with frequency. For the following discussion, the term "inter-loudspeaker differential phase" (IDP) is defined as the difference in phase of sounds arriving at a listening position from a pair of stereo loudspeakers.

We assume we have a stereo loudspeaker system with a left loudspeaker and a right loudspeaker (see FIG. 4*a*). A listener located equidistantly from the two left and right loudspeakers experiences essentially no IDP because sounds presented by both loudspeakers take the same amount of time to reach the listener's ears (see FIG. 4*b*).

Figure 5A:
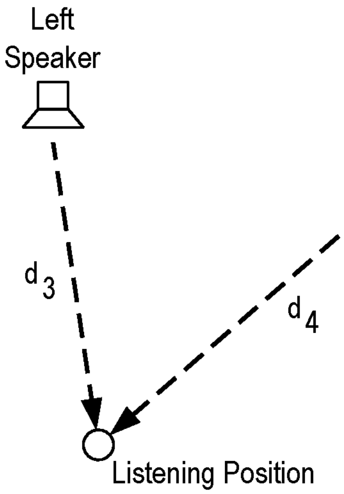
FIG. 5*a* schematically shows a spatial relationship of a listening position offset in relation to two loudspeakers, FIG. 5*b* schematically shows an idealized interaural phase difference (IDP) response for all frequencies at the listening position of FIG. 5*a,*
Figure 5B:
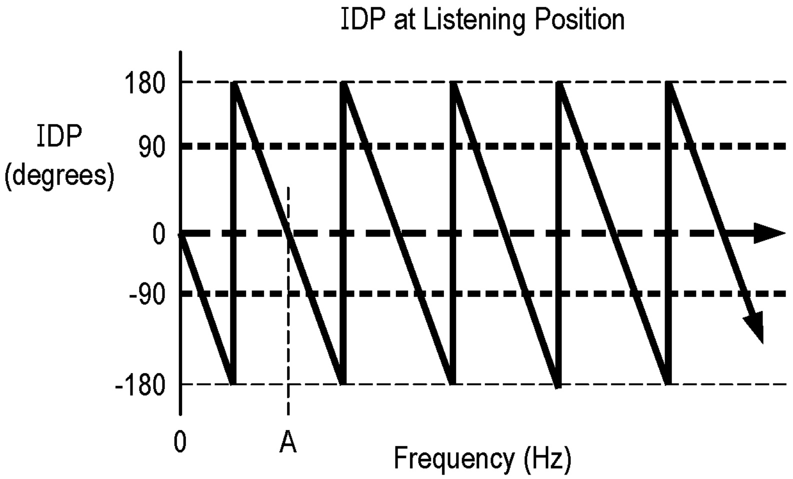

FIG. 5*a* schematically shows a spatial relationship of a listening position offset in relation to two loudspeakers. In the example of FIG. 5*a*, a listener is offset (not equidistant) from a pair of stereo loudspeakers, that is, the listener is closer to one of the loudspeakers. When a listener is not equidistant to a pair of loudspeakers, such as in FIG. 5*a*, sounds common to both loudspeakers arrive at the listener at different times, with sounds from the nearest loudspeaker arriving first. The relative time delay causes an IDP that varies across frequency as shown in FIG. 5*b*. The IDP has a periodic behavior in which it periodically increases linearly and decreases linearly with frequency. Frequencies with values closer to 0 degrees than −180 or 180 degrees (i.e., between −90 and 90 degrees) are considered "in phase" or reinforcing and frequencies closer to −180 or 180 degrees than 0 degrees (i.e., between 90 and 180 degrees or between −90 and −180 degrees) are considered "out of phase" or canceling (see FIGS. 4*b* and 5*b* the dashed lines indicating −90 degrees and +90 degrees). For audio common (monoaural audio) to both loudspeakers, the variation of sound level across frequency at the listening position causes poor timbre perception. The variation in phase causes poor spatial or directional perception. In a typical vehicle environment, i.e. with a delay due to a typical distance of a listener from the two loudspeaker, the IDP for each listener is as follows. Frequencies between 0 and approximately 250 Hz are predominantly in phase—that is the IDP is between-90 and 90 degrees. Frequencies between approximately 250 Hz and 750 Hz are predominantly out of phase—that is the IDP is between 90 and 180 degrees or between −90 and −180 degrees. Frequencies between approximately 750 Hz and 1250 Hz are predominantly in phase. This alternating sequence of predominantly in phase and predominantly out-of-phase bands continues with increasing frequency up to the limit of human hearing at approximately 20 kHz. In this example, the cycle repeats every 1 kHz. The exact start and end frequencies for the bands are a function of the interior dimensions of the vehicle and the location (listening positions) of the listeners.

Figure 6:
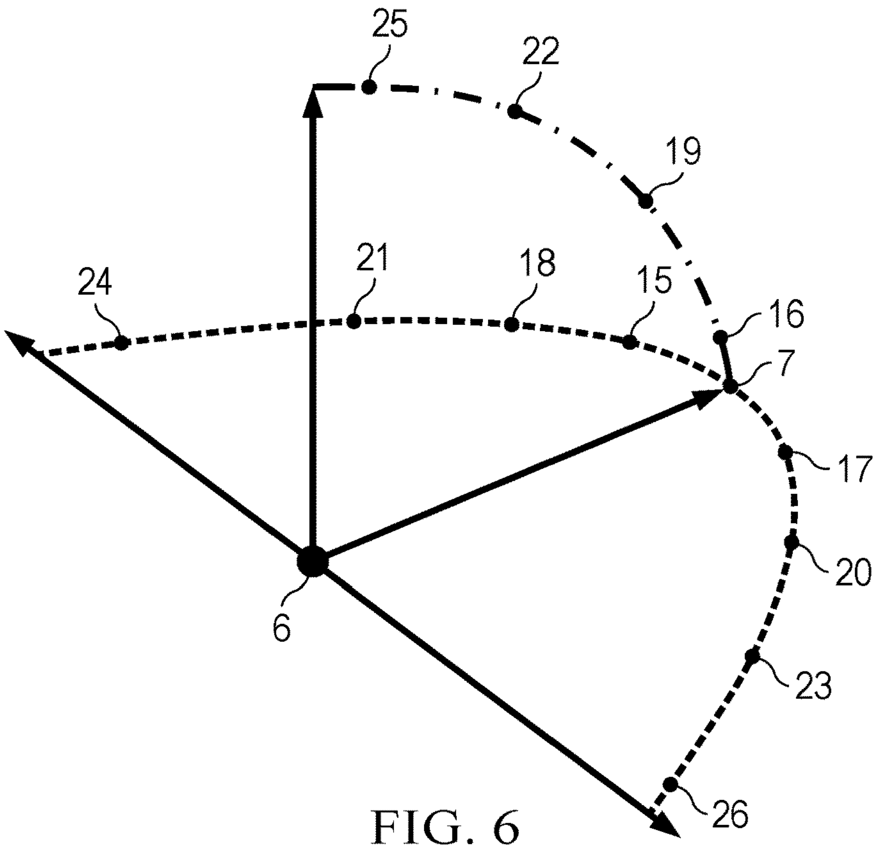
FIG. 6 schematically shows how height perception at a listening position equidistant from two loudspeakers varies depending on the extent of lateral spacing of the loudspeakers, FIG. 7*a* schematically shows a spatial relationship of two listening positions, each offset symmetrically in relation to two loudspeakers, FIG. 7*b* and FIG. 7*c* schematically show how the IDP varies with frequency for each of the two listening positions shown in FIG. 7*a,*

FIG. 6 schematically shows how perception of sound height varies at a listening position 6 equidistant from two loudspeakers, depending on the extent of lateral spacing of the two loudspeakers from listening position 6.

When a listener in listening position 6 is equidistant to two stereo loudspeakers that are in front of the listener and fairly close together—e.g. narrowly spaced to the left and right directly in front of the listener—and the same audio signal (monoaural or mono) is played out of both loudspeakers, the sound appears to originate in-between the two loudspeakers without a perceived increase in elevation, hence the use of terms like "phantom". For loudspeakers narrowly spaced, in the example of FIG. 6 e.g. located at positions narrower than positions 15 and 17, sound appears to originate from position near 7, i.e. with little or no perception of sound height or elevation.

When lateral spacing or angular spacing of the loudspeakers relative to the forward-looking direction of listener 6 increases, the perceived sound height (so-called phantom image) tends to rise in elevation.

In the Example shown in FIG. 6, for loudspeakers located at positions 15 and 17 correspond a sound perceived at location closer to 16. For loudspeakers located at positions 18 and 20 correspond a sound perceived at location closer to 19. For loudspeakers located at positions 21 and 23 correspond a sound perceived at location closer to 22 and for loudspeakers located at positions 24 and 26 correspond a sound perceived at location closer to 25. In other words, as the angle between the loudspeakers increases, the perceived sound height of the phantom image increases. This psychoacoustic phenomenon tends to work best at lower frequencies (e.g. at frequency lower than 5 kHz).

Document "Elevation localization and head-related transfer function analysis at low frequencies" from V. Ralph Algazi, Carlos Avendano, and Richard O. Duda, The Journal of the Acoustical Society of America 109, 1110 (2001), shows that torso reflection may be the main cue for the perception of sound height/elevation at low frequencies. When a crosstalk interaural delay, i.e. the delay with which a loudspeaker audio signal reaches the ear at the opposite side of the loudspeaker of symmetric loudspeakers matches the shoulder reflection delay of a real elevated audio source, the resulting phantom image might be perceived to be elevated at a similar position of the real elevated audio source in the median plane. When a loudspeaker is placed above the head of a listener, the listener gets a direct sound at the ear from the loudspeaker, then a bit later a reflected sound from the torso/shoulder. It has been found that this delay from the direct to reflected sound is about the same delay introduced by the interaural crosstalk delay of the head when the loudspeakers are laterally, in particular, widely, spaced with respect to the listening position (for example positions 24 and 26 in FIG. 6). In the crosstalk case, since the source is monaural (same to both loudspeakers), it appears to the ear as the same source, just delayed similar to the torso reflection.

As the angular spacing of the loudspeakers gets bigger (up to ±90 deg) the crosstalk delay of the listener's head grows and so the perceived elevation of sound.

It is theorized that this crosstalk delay of the head's listener is what makes the phantom center height to increase.

The inventors have realized that this psychoacoustic phenomenon can be used in loudspeaker systems, such as e.g. in vehicles' loudspeakers systems, where angular spacing between loudspeakers is usually large, for example larger than a minimum angle value, e.g. larger than 10, 15 or 20 degrees. However, the phenomenon can be reproduced when the listening position, or listener is located symmetrically with respect to the angular spaced loudspeakers. This is usually not the case in vehicles because the passengers have assigned seats (see FIG. 3) symmetrically off center with respect to the loudspeakers of the loudspeaker system (see FIGS. 1 and 3).

Therefore, the inventors have realized that in order to provide a perception of sound height in a vehicle or in a listening environment with properly spaced pair of loudspeakers, the sound image at the listening position should be perceived by the listener as symmetrically located relative to a pair of loudspeakers. In other words, the sound image should be "virtually centered". In case of a single listening position as shown in FIG. 5*a*, this problem can be solved, simply by introducing a delay to the audio signal played back by the far loudspeaker, thereby compensating for the different time at which the audio signals emanated from the loudspeakers reach the listening position. Introducing a delay has the same effect of reducing a relative phase between the two audio signals in the corresponding frequency bands in which the phase differences are predominantly out of phase (see FIG. 5*b*). This reduction of the phase has the effect to ideally obtain a flat IDP as that shown in FIG. 4*b*, or an IDP where for all frequency the IDP is in the range between −90 and 90 degrees. However, introducing a delay only flattens the IDP for one of the two off-center listening positions, shown in FIG. 7*a*. In contrast, as it will be shown below, the virtual centering processing of the present disclosure may be also used to correct the IDP for both off-center listening positions, thereby increasing the perception of height for both listening positions.

Compared to the prior art, a different use of virtual centering the signal is envisaged in this disclosure. Instead of virtual centering the full (monaural) audio signal, only a portion of the audio signal which is supposed to be perceived with sound elevation is 'virtual centered'. In audio signals in an immersive format, this portion of the audio signal corresponds to the height channel. In this disclosure only the height channel or a portion thereof (or audio signal thereof) is 'virtual centered' so that only the height channel can be perceived with sound height/elevation as described with reference to FIG. 6. The phase differences varying with frequency between two monaural audio signals emanated (simultaneously) by the two off-center symmetrically located loudspeakers are obtained for each of a plurality of frequency bands. Once the phase difference applicable to each of the frequency band are obtained, the height channel can be 'virtual centered' by modifying the phase between two (e.g. monoaural) height audio signals in the corresponding frequency bands where the phase differences are found to be predominantly out of phase.

A single height channel (so-called 'voice of God') can serve this purpose. The audio signal corresponding to the same height channel is used as monaural audio signal and processed by modifying the relative phase between two equal monoaural audio signals so derived.

The height audio signals with modified phase are then played back in the processed audio with the two audio loudspeakers of the non-immersive loudspeaker system such that sound has elevation/height perception thanks to the virtual centered height channel.

In an embodiment, the audio in the immersive audio format may comprise one or more height audio channels but also one or more additional audio channels different from the one or more height audio channels. In an embodiment, any other audio channel additional to the one or more height channels, are not virtual centered. Alternatively, additionally or optionally, some of or all the additional audio channels are also virtual centered in a separate "virtual center" processing or algorithm.

In the above discussion we assumed a single listening position symmetrically off-center with respect to a pair of, e.g. stereo, loudspeakers.

However, e.g., in vehicles, there may be two listeners (e.g. located at different listening positions), for example in each row of the vehicle as shown in FIG. 3.

Figure 7A:
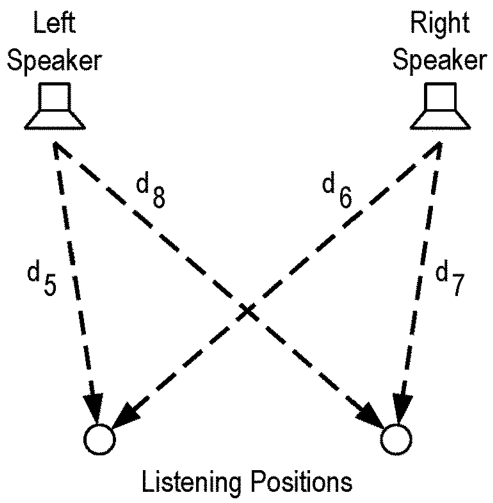

FIG. 7*a* schematically shows a spatial relationship of two listening positions, each symmetrically off-center in relation to two loudspeakers, left loudspeaker and right loudspeaker.

Figure 7B:
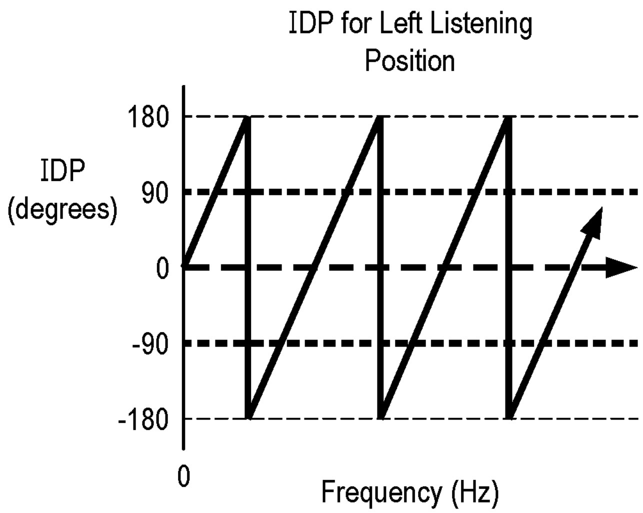
Figure 7C:
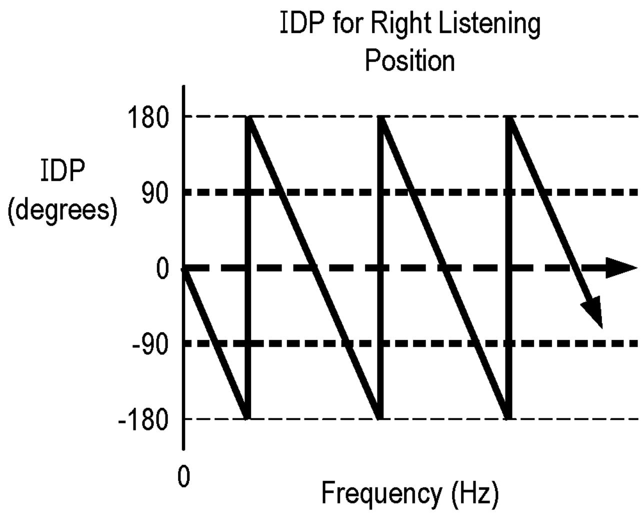

FIG. 7*b* and FIG. 7*c* schematically show how the IDP varies with frequency for each of the two listening positions shown in FIG. 7*a*. Also, in this example of IDPs, it can be seen for each cycle of the IDP, there are frequencies that are predominantly in phase and frequencies that are predominantly out of phase. That is, frequencies where the IDP is between −90 and 90 degrees, and frequencies where the IDP is either between −90 and −180 or between 90 and 180 degrees.

The frequencies where the IDP is predominantly out of phase cause undesirable audible effects including blurring of imaging of audio signals presented through both loudspeakers. A solution to this problem was found in EP1994795B1 which is hereby incorporated by reference in its entirety. In EP1994795B1 it was shown that it is possible to 'virtual center' two listening positions both symmetrically off-center from the same pair of (stereo) loudspeakers at the same time. This follows the same principle of reducing the phase differences of an IDP of a single listening position. In case of two listening positions, the phase differences of the IDP obtained for each of the two listening positions are simultaneously reduced such that each IDP at each listening position has across the desired frequency range values between −90 and 90 degrees.

However, in this disclosure, simultaneous 'virtual centering' of two listening positions both symmetrically off center from the same pair of (stereo) loudspeaker has not the effect of reducing undesirable audible effect such as blurring of imaging of audio signal but has the effect of providing height perception to sound emanated from the loudspeakers. This is done by only using one or more height channels of audio in an immersive audio format as input to a "virtual center algorithm", as for example described in EP1994795B1. Only a portion of one or more height channels are virtual centered by the virtual center algorithm. The inherent large angular (lateral) spread of the loudspeakers, e.g. in vehicles' loudspeaker systems, is used to provide perception of height in the sound emanated by the pair of loudspeakers, according to the psychoacoustic phenomenon described with reference to FIG. 6.

In an embodiment, the (e.g. rendered) audio comprises not only at least one height channel, but also at least two further audio channels. In this embodiment, with reference to FIG. 2, method 200 may further comprises mixing 280 each of the at least two phase modified height audio signals with each of the two further audio channels.

This embodiment will be explained with reference to FIGS. 2, 2*a* and FIG. 8 in which it is assumed that the audio in the immersive audio format has a single audio height channel and two additional audio channels.

Figure 8:
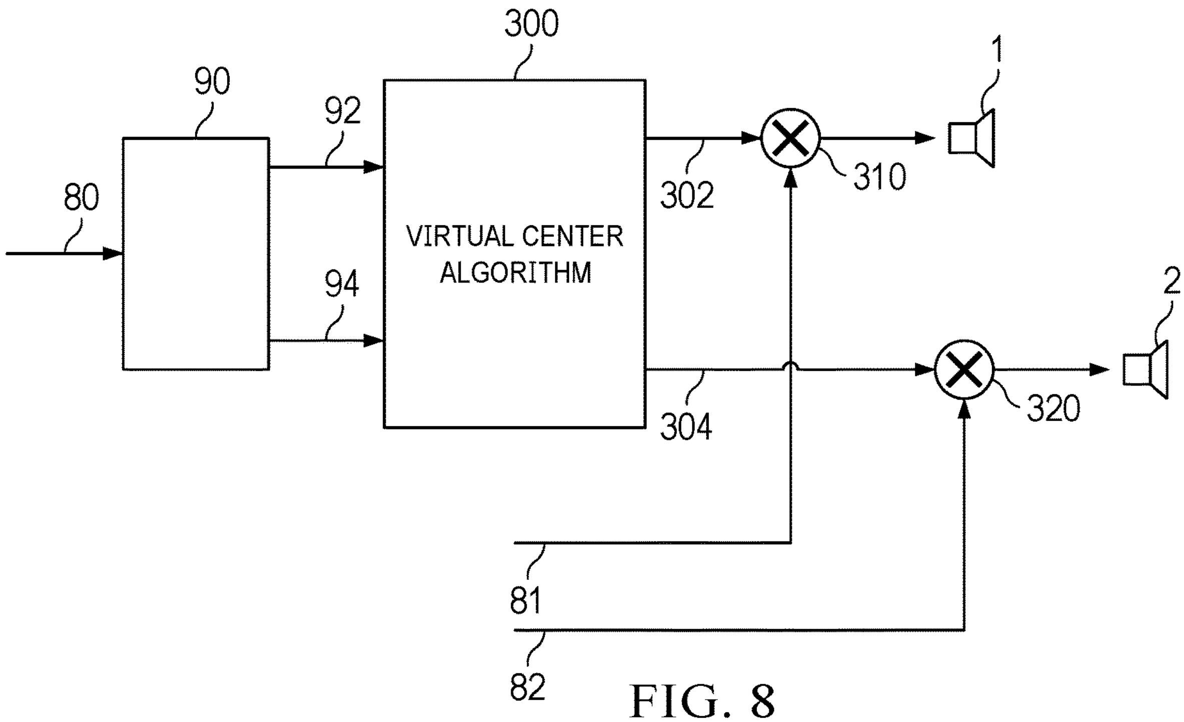
FIG. 8 schematically shows an example of a method of processing audio in an immersive format according to an embodiment of the disclosure, FIG. 9 schematically shows an example of a method of processing audio in an immersive format according to an embodiment of the disclosure, FIG. 10 schematically shows an example of a method of obtaining height audio signals from two height audio channels, FIG. 11 schematically shows another example of a method of obtaining height audio signals from two height audio channels.

FIG. 8 schematically shows an example of a method of processing audio in an immersive format according to an embodiment of the disclosure. The immersive audio format may include single height audio channel 80 and two further audio channels 81 and 82. In block 90, two height audio signals 92 and 94 are obtained from at least a portion of height audio channel 80.

Figure 2A:
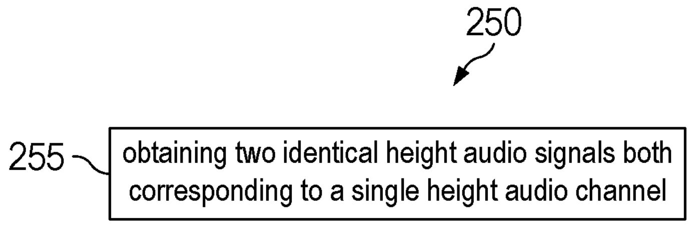
FIG. 2*a* is a flowchart illustrating an example of a method of obtaining two height audio signals according to some embodiments of the disclosure.
Figure 2A:
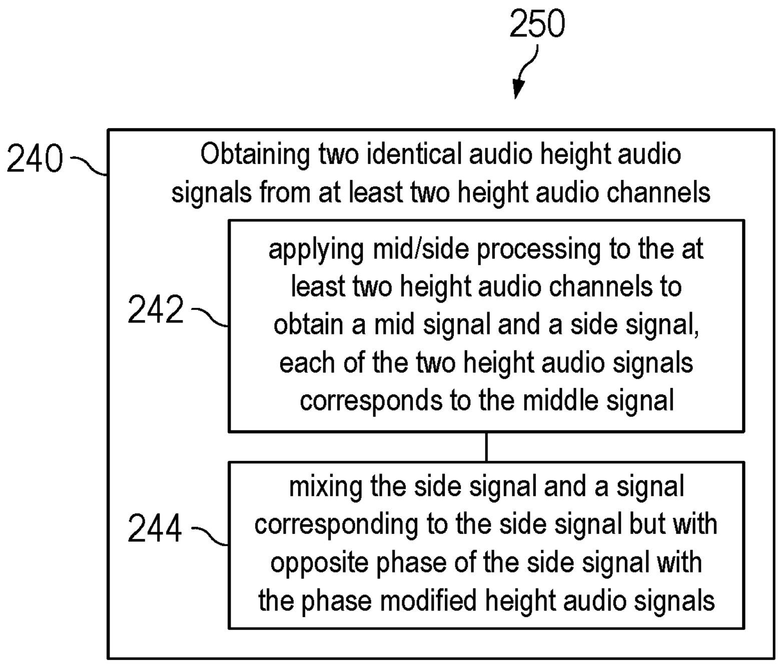

FIG. 2*a* is a flowchart illustrating an example of a method of obtaining two height audio signals according to some embodiments of the present disclosure.

In an embodiment, with reference to FIG. 2*a*, obtaining 250 the two height audio signals comprises obtaining 255 two identical height audio signals both corresponding to the single height audio channel. Block 90 of FIG. 8 may take input height audio channel 80 and may input this same signal as height audio signals 92 and 94 to "Virtual Center Algorithm" block 300. In the context of this disclosure, block 300 is configured to perform a 'Virtual Center Algorithm'. The 'Virtual Center Algorithm' takes as inputs two audio signals emanated by two loudspeakers symmetrically off-center and laterally spaced with respect to one or more listening positions, and provide as output two phase-modified audio signals such that a relative phase between the two input signals is modified in a way that the output audio signals are perceived by listeners located at the one or more listening positions substantially at the center of the two laterally spaced loudspeakers. This can be done by reducing the Interaural phase difference or inter-loudspeaker differential phase (IDP) between the two audio channels corresponding to the two loudspeakers used for payback. In the context of this disclosure, the 'Virtual Center Algorithm' is advantageously and inventively applied to input audio signals derived from one or more height channels of audio in an immersive audio format such to provide perception of audio height/elevation to listeners located at the one or more listening positions for the audio played back by the loudspeakers.

In an embodiment, the non-immersive loudspeaker system for playback of processed audio may be a stereo loudspeaker with a left loudspeaker 1 and a right loudspeaker 2, shown in FIG. 8.

In an embodiment, more than one single height channel may be inputted to block 90. For example, two height audio channels may be inputted to block 90. For example, the immersive audio format may include two height audio channels. In this embodiment, obtaining 250 the two height audio signals may comprise obtaining 240 two identical audio height audio signals from the two audio channels (see step 240 with reference to FIG. 2*a*). When the immersive audio includes two height audio channels, block 90 may be configured to pass-through (i.e. without performing any specific function) the two height audio channels to block 300 as signals 92 and 94, respectively. For example, assume that in this example the non-immersive loudspeaker system is a front (or rear) stereo loudspeaker system of a vehicle with left front (or rear) loudspeaker 1 and right front (or rear) loudspeaker 2. Also assume that we would like to playback audio in an immersive format having a left front (or rear) height channel 92 and a right front (or rear) height channel 94, then both channels 92 and 94 may be directly inputted to the virtual center algorithm of block 300. Alternatively, if the audio has only one height channel, this same channel may be inputted twice as height audio signals 92 and 94 as described above.

Block 300 may perform steps 250 and/or 270 of method 200 of FIG. 2. Block 300 may be configured to modify the relative phase difference between signals 92 and 94 to obtain phase modified signals 302 and 304, respectively. Two further audio channels 81 and 82 may be mixed with phase modified signals 302 and 304, respectively. For example, left front (or rear) phase modified height audio signal 302 is mixed with left front (or rear) channel 81 with mixer 310 and input to left loudspeaker 1 for playback. Similarly, right front (or rear) phase modified height audio signal 304 is mixed with right front (or rear) channel 82 with mixer 320 and input to right loudspeaker 2 for playback. Block 300 may be implemented with a set of filters, e.g. finite impulse response (FIR) filters or infinite impulse response (IIR) all-pass filters. Designing of IIR all-pass filters can be done with the Eigenfilter method. An example of such implementation will be described further below.

Block 300 may be configured differently for front and rear pair of loudspeakers to take into account for the different distance between the listener located at the one or more listening positions and the pair of front or rear pair of loudspeakers symmetrically off-center with respect to the listener's location. For example, block 300 may be configured for front passenger and/or driver according to the distances between the front passenger and/or driver and the front loudspeakers. Alternatively, block 300 may be configured for one and/or both rear passengers according to the distances between the rear passenger(s) and the rear loudspeakers.

Figure 2B:
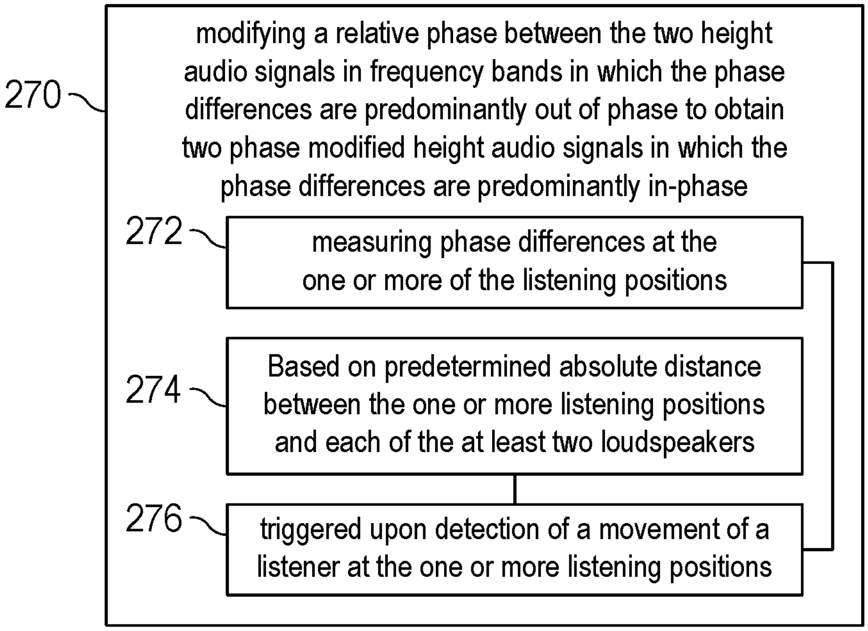
FIG. 2*b* is a flowchart illustrating an example of a method of modifying a relative phase between two height audio signals, FIG. 3 schematically show a vehicle, FIG. 4*a* schematically shows a spatial relationship of a listening position and two loudspeakers in which the listening position is equidistant from the loudspeakers, FIG. 4*b* schematically shows an idealized interaural phase difference (IDP) response for all frequencies at the equidistant listening position of FIG. 4*a,*

With reference to FIG. 2*b*, in an embodiment, the step of modifying 270 a relative phase between the two height audio signals may comprise (e.g. actively) measuring 272 phase differences varying with frequency between two monaural audio signals emanated from at least two loudspeakers at the one or more of the listening positions. For example, measurement of the phase differences may be performed in an initial calibration stage of the method. Examples of how such measurements at the one or more listening positions can be used to modify the relative phase difference between two audio channels are provided in US patent U.S. Pat. No. 10,284,995B2, which is hereby incorporated by reference in its entirety. In the context of the present disclosure, the relative phase difference which is modified (e.g. reduced) is between two height audio signals, e.g. signals 92 and 94 in FIG. 8. For example, in one embodiment, one or more sensors may be located at or close to the listening positions to measure such phase differences. For example, in an embodiment, such sensors may be embedded on the head rest of each seat of the vehicle approximatively at the same height of the listener's head. Said measurements may be performed at an initial calibration stage of the method or, alternatively, substantially real-time with playback of the audio.

Still with reference to FIG. 2*b*, step 274, alternatively, additionally or optionally modifying 270 a relative phase between the two high audio signals may be based on predetermined absolute distances between the one or more listening positions and each of the at least two loudspeakers. For example, distances between the one or more listening positions (for example any of the positions at seats 110, 120, 130 or 140 of FIG. 3) and the pair of stereo loudspeakers may be determined/predetermined by the environment characteristics, e.g. the vehicle's interior design, and loudspeaker installation. The method of this disclosure may use this predetermined information for obtaining the phase differences. For example, in an embodiment, the step of modifying 270 a relative phase between the two height audio signals may involve accessing predetermined phase difference. For example, the phase differences as a function of frequency may have been measured for one vehicle of a certain type, and subsequently stored in the memory of an on-board computing system of vehicles of the same type. Such offline calibration has the advantage that vehicles do not need to be equipped with sensors for measuring the phase differences online. The predetermined phase differences may be for example be stored as an analytical function or a look up table (LUT). It can be shown, that there is a relation between the distance of the listeners to the left and right loudspeakers and the desired frequency response of block 300 which modifies the relative phase between signals 92 and 94 to obtain phase modified signals 302 and 304, respectively. As shown in EP1994795B1, the desired frequency response of block 300 is a function of a frequency $f_d$, corresponding to a wavelength equal to the path difference between the left and right loudspeakers at the off-center listening position:

$$f_d = \frac{c}{|d_L - d_R|}, \quad (1)$$

where $d_L$ is the distance from the listener to the left speaker, and $d_R$ is the distance from the listener to the right speaker and c is the speed of sound (all distances in meters). It can be shown that the multiple alternate ones of sequential frequency bands which predominantly out of phase are centered on frequencies that are integer multiples of $\frac{1}{2}f_d$ and thus the desired phase response of block 300 can be designed with the same frequency response.

In an embodiment, still with reference to FIG. 2*b* (step 276), the step of modifying 270 a relative phase between the two high audio signals (either based on predetermined listener to loudspeakers distance information or based on actual measurements) may be triggered upon detection of a movement of a listener located at the one or more listening positions. For example, one or more sensors may be employed to detect the movement of the listener. When employed in the interior of a vehicle, such sensors may be, e.g., located at respective seats of the vehicle. Said one or more sensors may be configured to detect the presence of a passenger or driver in a vehicle and thus enabling use of the correct distance information to be used by the processing method to obtain the phase differences.

In an embodiment, said one or more seat sensors or a different set of sensors may be used to detect a new listening position, e.g. a new location of the listener's head (or location of the listener's hears). For example, the driver or passenger may adjust his own seat horizontally and/or vertically for a more comfortable seating position in the vehicle. In this embodiment, the method may retrieve/obtain the phase differences according to the new detected listening position. In this way the correct distance information, either based on a correct set of predetermined listener to loudspeakers distance information or based on actual measurements, may be used according to the new listening position. For example, if/when predetermined phase differences are stored as an analytical function or a look up table (LUT), a different analytical function or a different LUT may correspond to a different (e.g. detected) seat or listening position.

Figure 9:
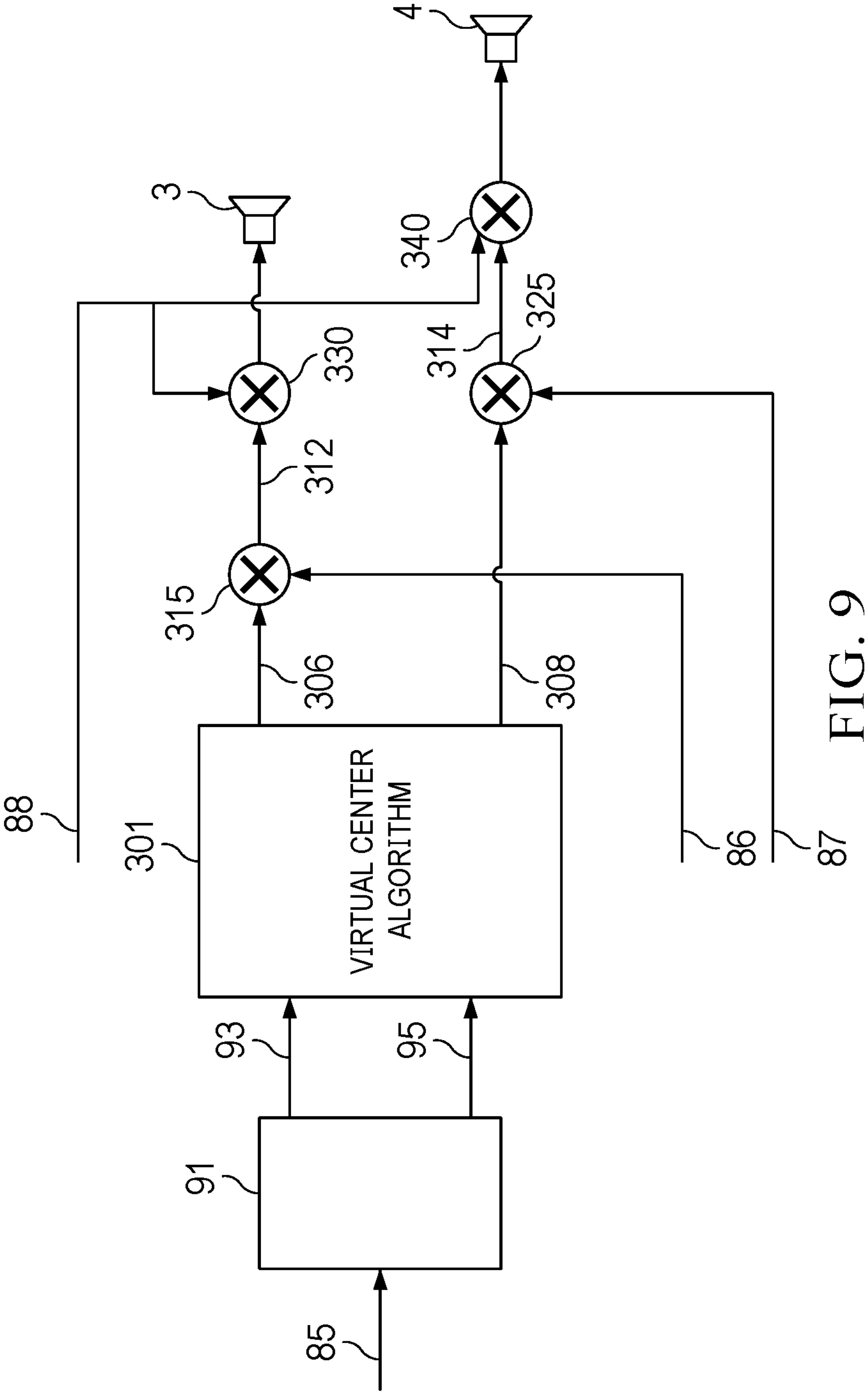

FIG. 9 schematically shows an example of a method of processing audio in an immersive format according to an embodiment of the disclosure. FIG. 9 differs from the example shown in FIG. 8 in that it is assumed that audio in the immersive audio format comprise an height channel 85, two audio channels, e.g. left and right audio channels 86 and 87 and additionally a center audio channel 88. From height channel 85, two height audio signals 93 and 95 are obtained via block 91. Block 91 may be the same of block 90 described with reference to FIG. 8. Block 91 may be configured to derive height audio signals 93 and 95 as a copy of height channel 85. If, however, the immersive audio format as more than one height channel, e.g., two height audio channels, block 91 may be configured to derive height audio signals 93 and 95 by passing through (step 257 in FIG. 2*a*) the two height channels. Height audio signals 93 and 95 are inputted to a block 301 which is functionally the same as block 300 described with reference to FIG. 8 and derive phase modified height audio signals 306 and 308 therefrom.

In this example, mixing (mixing 280 with reference to FIG. 2) each of the at least two phase modified height audio channels 306 and 308 with each of the two audio channels 86 and 87, generate mixed audio signals 312 and 314, respectively. Mixed audio signals 312 and 314 are further mixed with center audio channels 88, e.g. at mixers 330 and 340, respectively. Signals generated from mixers 330 and 340 are outputted to loudspeakers 3 and 4 for playback. This enables to playback a center channel of immersive audio with a loudspeaker system, e.g. a stereo loudspeaker system, which does not include a center channel.

More generally, in an embodiment, the center audio channel of the audio may be mixed (see step 285 in FIG. 2) directly with each phase modified audio signals 306 and 308, e.g. before mixing with audio channels 86 and 87 of the audio.

It is understood that the examples of FIG. 8 and FIG. 9 can be used interchangeably for front and rear pair of loudspeakers in the interior of a vehicle in order to provide sound height perception to passenger and/or driver located in a front row or rear row of a vehicle. It is also understood that the examples of FIG. 8 and FIG. 9 can be used interchangeably for front and rear pair of loudspeakers in any listening environment, e.g. different from the interior of a vehicle, and suitable for the specific implementation.

The example of FIG. 8 may be used for a pair of (stereo) loudspeakers 1 and 2 located in the rear row of a vehicle to create a perception of sound height for passengers located at the rear row of the vehicle. In this example, height channel 80 may be a rear height channel and channels 81 and 82 correspond to left rear and right rear channels, respectively. Height audio signals 92 and 94 derived from rear height channel are used to virtual center rear height channel 80, thereby recreating perception of sound height for passengers located at the rear row of the vehicle. Block 300 may be configured according to the distance between the one or more rear passengers and the rear pair of loudspeakers 1 and 2.

At the same time, alternatively or additionally, the example of FIG. 9 may be used for a pair of (stereo) loudspeakers 3 and 4 located in the front row of the same vehicle to create a perception of sound height for passengers located at the front row of the vehicle. In this example, height channel 85 may be a front height channel and channels 86 and 87 correspond to left front and right front channels, respectively. Height audio signals 93 and 95 derived from front height channel 85 are used to virtual center front height channel 85, thereby recreating perception of sound height for the front passenger and/or driver. Block 301 may be configured according to the distance between the front passenger and/or driver and the front pair of loudspeakers 3 and 4. Therefore, block 301 may be the same as block 300 but configured differently for operating with a different set of predetermined distances (e.g. a different set of analytical functions or LUTs) between the front passenger and/or the driver and the front right and left loudspeakers 3 and 4.

Alternatively, as explained above, block 301 may be configured to use actual measurements of the sound perceived at the front driver and/or front passenger locations from the sound emanated by the front left and right loudspeakers 3 and 4.

Alternatively, a single block similar to block 300 or 301 may be configured differently for operating with a different set of predetermined distances and/or actual measurements (e.g. a different set of analytical functions or LUTs) between the front and/or rear passenger and/or the driver and the respective front and/or rear right and left loudspeakers.

Furthermore, combining the audio processing methods of FIG. 8 and FIG. 9 in the same vehicle as explained in the example explained above, enables playback of a 5.1.2 audio.

The rear left and right channels and the rear height channel are played back with the rear left and rear right loudspeakers using method/system of FIG. 8. The front left, front right, center and height channels are played back with the method/system of FIG. 9.

However, the example of combining the methods/systems described above with reference to FIG. 8 and FIG. 9 in a vehicle is not limiting. For example, the exemplary methods/systems of FIG. 8 or FIG. 9 may be used to playback audio in different types of immersive audio format for create sound height for any of the front driver and/or front/rear passenger in the vehicle.

Figure 10:
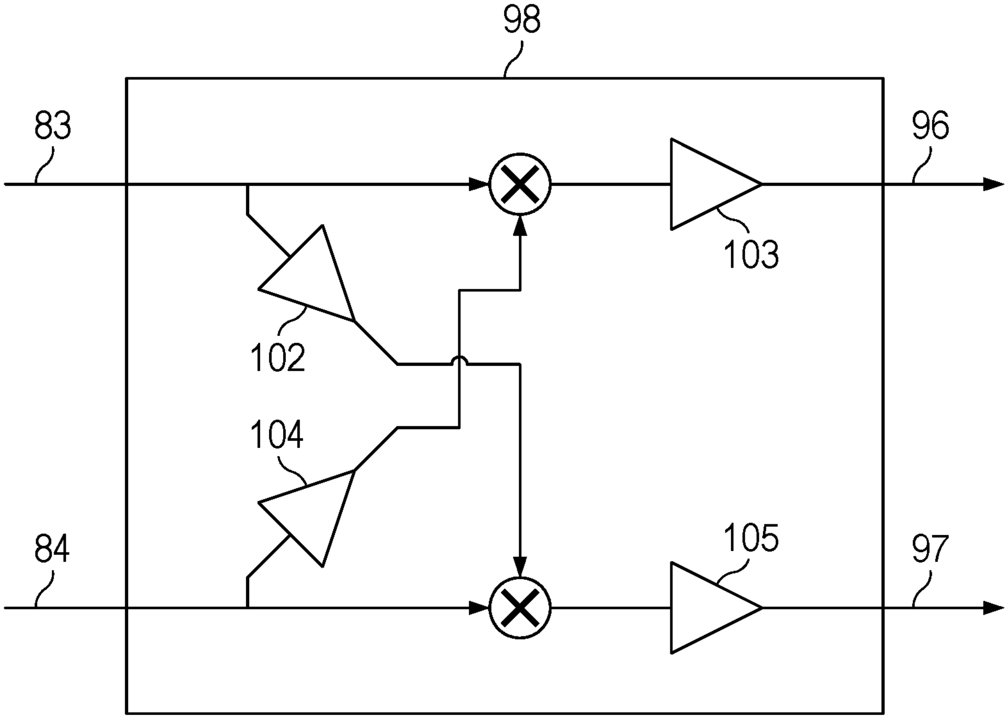

FIG. 10 schematically shows an example of a method of obtaining two height audio signals from two height audio channels. In this example, it is assumed that the (e.g. rendered) audio comprises two (instead of one) height channels 83 and 84 and that two height audio channels 96 and 97 are obtained from height channels 83 and 84.

However, the audio may comprise any number, e.g. more than two, of height channels suitable for the specific implementation.

When there is more than one height channel, it is possible that the height channels are different from each other to such an extent that the perception of sound height is diminished even when the height channels are "virtual centered", as explained above. In order to prevent that height channels are not perceived with sound height/elevation by the listener in the vehicle, e.g. to such an extent suitable for the specific implementation, the height channels may be processed such that two more similar or even identical signals can be used as inputs for the "virtual center algorithm". FIG. 10 shows an example of such a process.

Block 98 comprises units 102, 104 and optionally units 103 and 105. Each unit is configured to change the audio level of the audio signal to which the respective unit is applied. For example, a unit may be configured to apply a gain or an attenuation to the audio signal applied to which the unit is applied.

To explain further, an audio level of height channel 83 may be changed by unit 102. The signal at the output of unit 102 with the corresponding audio level may be mixed with height channel 84. The audio level of the mixed signal may be optionally changed by unit 105 to generate height audio signal 97.

Similarly, an audio level of height channel 84 may be changed by unit 104 and mixed with height channel 83. The audio level of the mixed signal is optionally changed by unit 103 to generate height audio signal 96. Similarity, e.g. in terms of audio level, between height audio signals 96 and 97 is regulated by units 102 and 104. Optionally, units 103 and 105 are applied after mixing the signals to maintain a constant power level of the signals before and after mixing the signals. Use of the optional units 103 and 105 may prevent that resulting height audio signals 96 and 97 are louder than intended. In particular, use of the optional units 103 and 105 may prevent that resulting height audio signals 96 and 97 are louder than the other channels (e.g. the surround channels) of the audio.

It is understood that block 98 may be used in place of block 90 or block 91 in FIG. 8 and FIG. 9, to process more than one height channel. It is also understood that, in the example of a vehicle, the two height channels may be front height channels or rear height channels and that audio with four height channels may thus be played back with a pair of front stereo loudspeakers and a pair of rear stereo loudspeakers. Therefore, audio, e.g. in 5.1.4 immersive audio format, may be played back with a simple stereo loudspeaker system. For example, the method/system of FIG. 8 may be used to process two height rear channels for the rear loudspeakers and the rear passengers. Similarly, the method/system of FIG. 9 may be used to process two height front channels for the front loudspeakers and the driver and/or the front passenger.

It should be also understood that the two height channels, when present, may be directly inputted to the "virtual center algorithm", without additional processing. For example, the two height channels may be substantially similar (monoaural) to each other, in which case no additional processing may be required.

Figure 11:
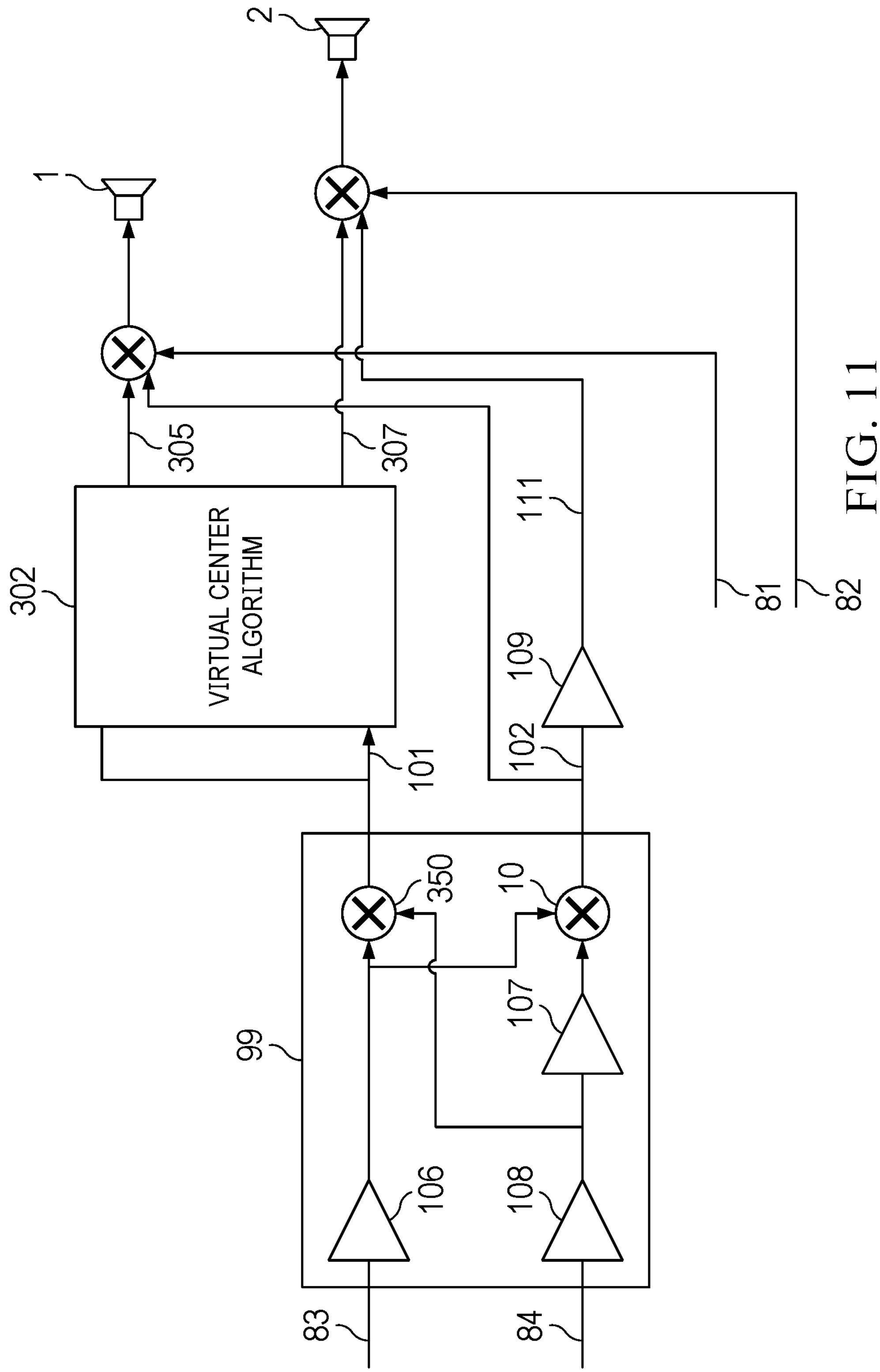

FIG. 11 schematically shows another example of a method of obtaining height audio signals from two height audio channels. As in the example described with reference to FIG. 10, it is also assumed here that the (e.g. rendered) audio comprises two (instead of one) height channels 83 and 84. Height channels 83 and 84 are processed by mid/side processing block 99 to obtain height audio signals 101 and 102 (see step 242 in FIG. 2*a*). Height audio signal 101 is the mid/center signal of height channels 83 and 84. Height audio signal 102 is the side signal of height channels 83 and 84. Mid/side processing block 99 can be implemented in any manner suitable for the specific implementation. In the example of FIG. 11 mid/side processing block 99 comprises attenuating units 106 and 108 configured to attenuate by half, height channels 83 and 84. Mid/side processing block 99 further comprises negative unity element 107. Negative unity element 107 is configured to apply a negative gain equal to −1. Height channels 83 and 84, processed by attenuating units 106 and 108 are mixed at mixer 350 to obtain mid signal 101, i.e.:

$$S_{101} = \frac{1}{2}S_{83} + \frac{1}{2}S_{84}, \tag{2}$$

where $S_{83}$ and $S_{84}$ are the signals of height channels 83 and 84 and $S_{101}$ is the height audio signal (mid signal) inputted to "virtual center algorithm" block 302.

The mid signal of mid/side processing usually contains sound that is the same in the processed height channels. This enables that sound that is the same in height audio channels 83 and 84 is inputted to "virtual center algorithm" block 302.

Sound that is different between channels 83 and 84 is represented by side signal 102:

$$S_{102} = \frac{1}{2}S_{83} - \frac{1}{2}S_{84}, \tag{2}$$

where $S_{83}$ and $S_{84}$ are the signals of height channels 83 and 84 and $S_{102}$ is the height audio signal (side signal) which is not inputted to "virtual center algorithm" block 302.

Side signal $S_{102}$ of height channels 83 and 84 is mixed with phase modified signals 305 and 307 and channels 81 and 82 of the audio prior output to loudspeakers 1 and 2. The method of FIG. 11 further comprises negative unity element 109 to invert the phase of side signal $S_{102}$ prior mixing a side signal 111, which is equal to side signal $S_{102}$ but with opposite phase, with audio channel 82 and phase modified signal 307 (see step 244 of FIG. 2*a*). Therefore, side signal $S_{102}$ is mixed back to the "virtual centered" middle signal $S_{101}$ to restore the original height channel signal and at the same time providing enhanced perceived sound height.

It is understood that, as explained with reference to FIG. 10, height channels 83 and 84 may be left and right height channels, respectively. More in particular, in a vehicle, height channels 83 and 84 may be front or rear left and right height channels, respectively. Similarly, loudspeakers 1 and 2 may be left and right stereo loudspeakers. More in particular, in a vehicle, loudspeakers 1 and 2 may be the front or rear left and right stereo loudspeakers. Although not shown in FIG. 11, when present, a center channel may be mixed with phase modified height audio signal 305, side signal 102 and audio channel 81, as shown in FIG. 9. The center channel may be also mixed with phase modified height audio signal 307, phase inverted side signal 111 and audio channel 82.

In the examples of FIGS. 8, 9 and 11, the channels used for playback are less than the number of channels of the input audio in the immersive audio format. Therefore, this implies that the channels of the input audio of the immersive audio format are downmixed in the channels (loudspeaker feeds) for playback.

Figure 12A:
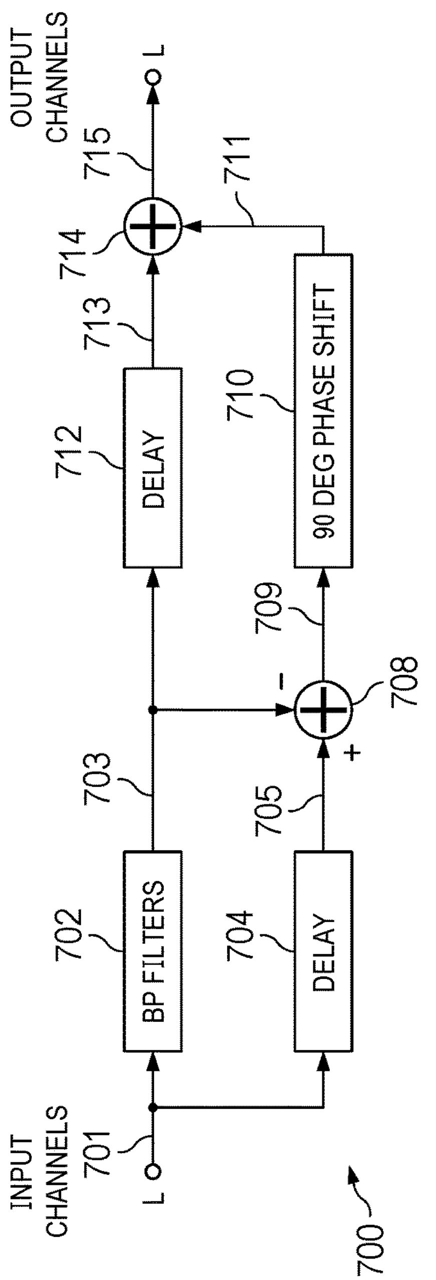
FIG. 12a (PRIOR ART)
FIG. 12*a* shows a functional schematic block diagram of a possible prior art FIR based implementation, as applied to one of two height channels, in this case, the left height channel.

FIG. 12*a* shows a functional schematic block diagram of a possible prior art FIR based implementation, as applied to one of two height channels, in this case, the left height channel.

Figure 12B:
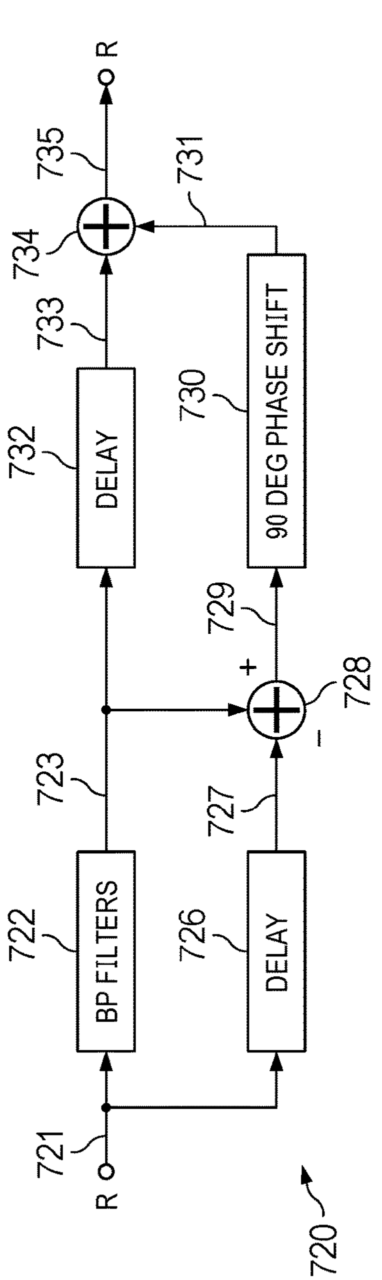
FIG. 12b (PRIOR ART)
FIG. 12*b* shows a functional schematic block diagram of a possible prior art FIR based implementation, as applied to one of two height channels, in this case, the right height channel.

FIG. 12*b* shows a functional schematic block diagram of a possible prior art FIR based implementation, as applied to one of two height channels, in this case, the right height channel.

As explained above, IDP phase compensation for an arrangement such as in the example of FIG. 7*a* may be implemented using finite impulse response (FIR) filters and linear-phase digital filters or filter functions. Such filters or filter functions may be designed to achieve predictable and controlled phase and magnitude responses. FIGS. 12*a* and 12*b* show block diagrams of possible FIR based implementations, as applied, respectively, to one of the two height audio signals. Both FIR based implementation are described in EP1994795B1, which is hereby incorporated by reference in its entirety.

Figure 13A:
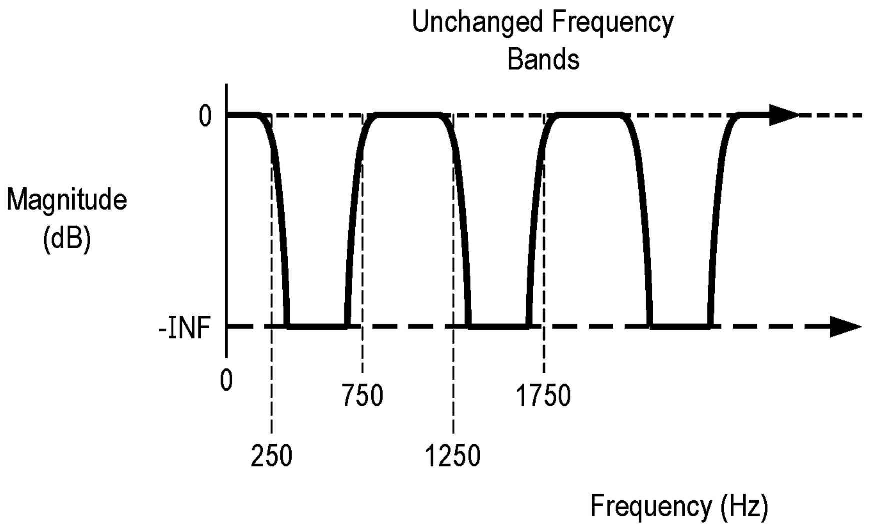
FIG. 13a (PRIOR ART)
FIG. 13*a* shows an idealized magnitude response of the signal output 703 of the filters or filter functions 702 of FIG. 12*a,*

In the example of FIG. 12*a*, two complementary comb-filtered signals (at 703 and 709) are created that if summed together, would have an essentially flat magnitude response. FIG. 13*a* shows the comb-filter response of bandpass filter or filter functions ("BP Filter") 702. Such a response may be obtained with one or a plurality of filters or filter functions.

Figure 13B:
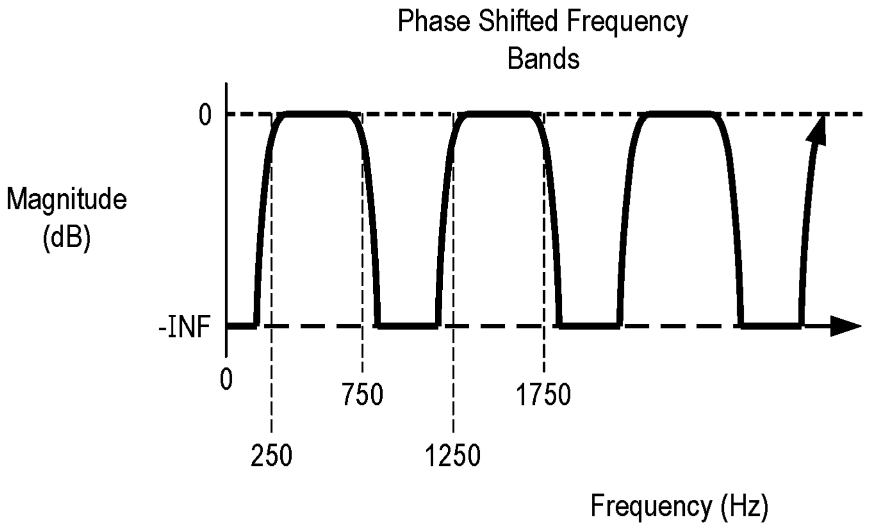
FIG. 13b (PRIOR ART)
FIG. 13*b* shows an idealized magnitude response of the signal output 709 of the subtractor or subtractor function 708 of FIG. 12*a,*

FIG. 13*b* shows the effective comb-filter response that results from the arrangement shown in FIG. 12*a* of BP Filter 702, a time delay or a delaying function ("Delay") 704 and a subtractive combiner 708. BP Filter 702 and Delay 704 may have substantially the same delay characteristics in order for the comb-filter responses to be substantially complementary (see FIGS. 13*a* and 13*b*). One of the comb filtered signals is subjected to a 90 degree phase shift to impart the desired phase adjustment in the desired frequency bands. Although either of the two comb-filtered signals may be shifted by 90 degrees, in the example of FIG. 12*a* the signal at 709 is phase shifted. The choice to shift one or the other of the signals affects the choice in the related processing shown in the example of FIG. 12*b* so that the total shift from channel to channel is as desired. The use of linear phase FIR filters allows both comb filtered signals (703 and 709) to be economically created using a filter or filters that select for only one set of frequency bands as in the example of FIG. 13*a*. The delay through BP Filter 702 may be constant with frequency. This allows the complementary signal to be created by delaying the original signal by the same amount of time as the group delay of the FIR BP Filter 702 and subtracting the filtered signal from the delayed original signal (in the subtractive combiner 708, as shown in FIG. 12*a*). Any frequency invariant delay imparted by the 90 degree phase shift process should be applied to the non-phase-adjusted signal before they are summed together, to again ensure a flat response.

The filtered signal 709 is passed through a broadband 90 degree phase shifter or phase shift process ("90 Deg Phase Shift") 710 to create signal 711. Signal 703 is delayed by a delay or a delay function 712 having substantially the same delay characteristics as 90 degree phase shift 710 to produce a signal 713. 90-degree-phase-shifted signal 711 and delayed signal 713 are inputted to an additive summer or summing function 714 to create an output signal 715. The 90 degree phase shift may be implemented using any one of a number of known methods, such as the Hilbert transform. Output signal 715 has substantially unity gain, with only very narrow −3 dB dips at frequencies corresponding to the transition points between the unmodified and phase shifted bands, but has a frequency varying phase response, shown in FIG. 13*c*.

Figure 13C:
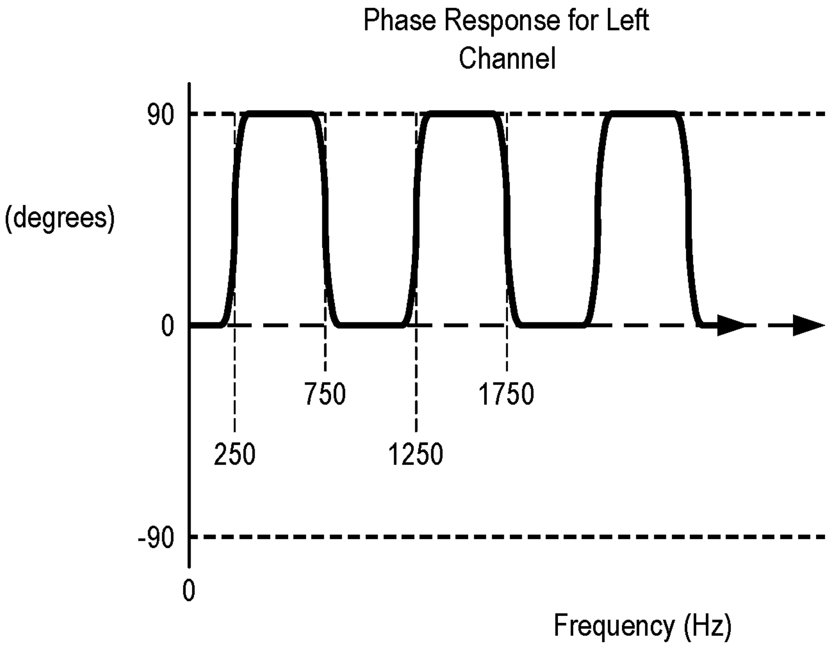
FIG. 13c (PRIOR ART)
FIG. 13*c* shows an idealized phase response of the output signal 715 of FIG. 12*a,*
Figure 13D:
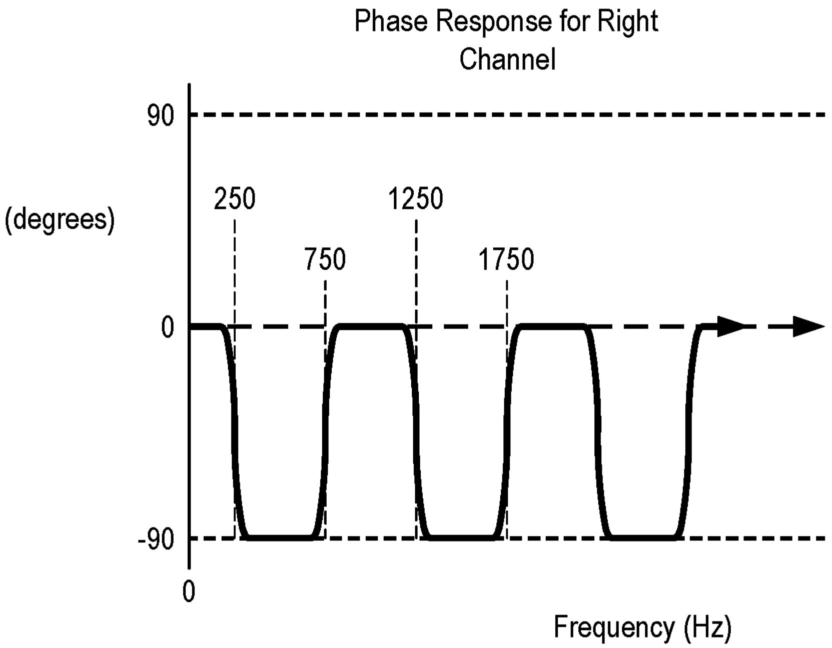
FIG. 13d (PRIOR ART)
FIG. 13*d* shows an idealized phase response of the output signal 735 of FIG. 12*b,*

FIG. 12*b* shows a possible prior art FIR based implementation, as applied to a right height channel. This block diagram is similar to that for the left height channel of FIG. 12*a* except that the delayed signal (signal 727 in this case) is subtracted from the filtered signal (signal 723 in this case) instead of vice-versa. The final output signal 735 has substantially unity gain but has a minus 90 degree phase shift for the phase shifted frequency bands as shown in FIG. 13*d* (compare to positive 90 degrees in the left channel as shown in FIG. 13*c*).

Figure 13E:
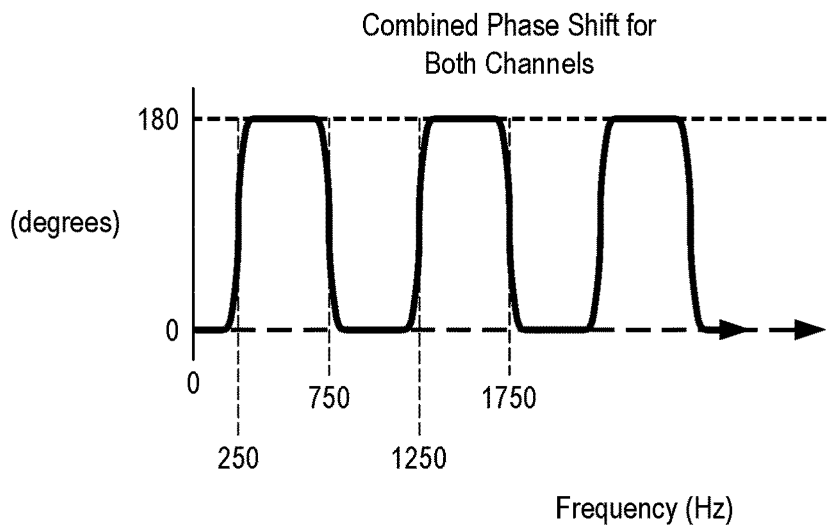
FIG. 13e (PRIOR ART)
FIG. 13*e* shows an idealized phase response representing the relative phase difference between the two output signals 715 of FIG. 12*a* and 735 of FIG. 12*b,*
Figure 13F:
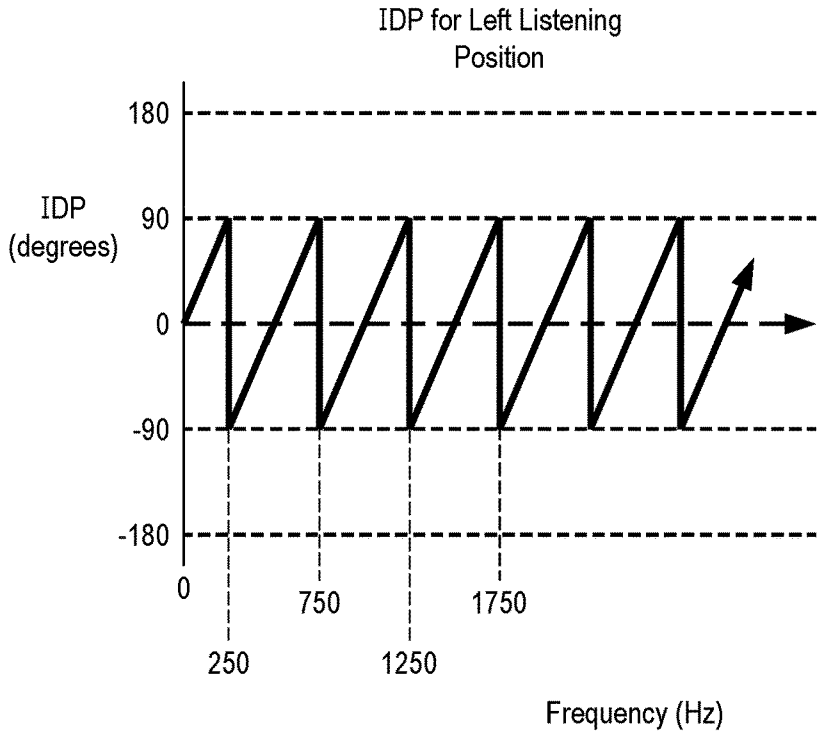
FIG. 13f (PRIOR ART)
FIG. 13*f* and FIG. 13*g* schematically show how the corrected IDP varies with frequency for each of the two listening positions shown in FIG. 7*a,*
Figure 13G:
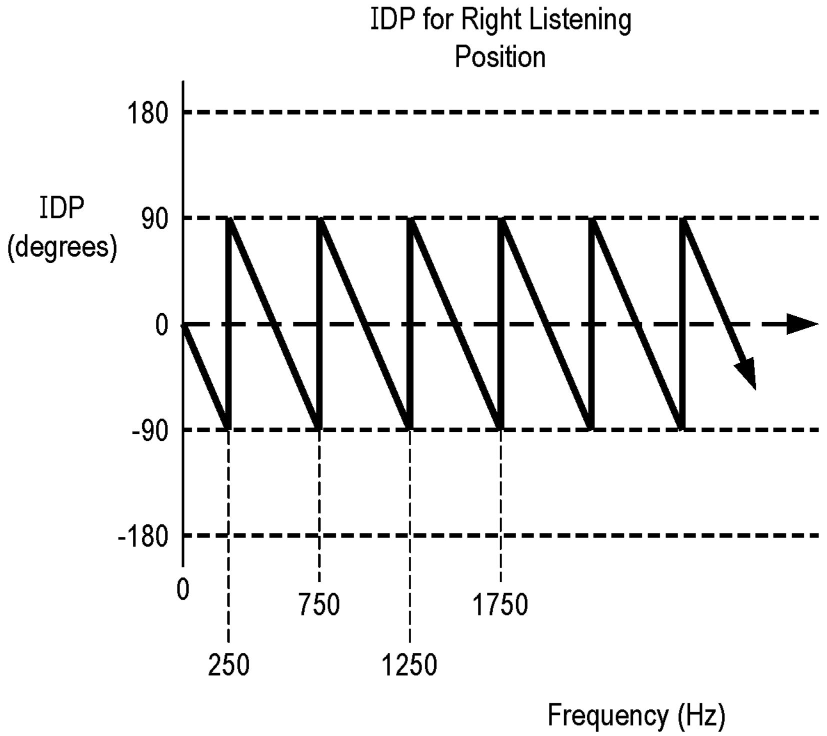
FIG. 13g (PRIOR ART)

The relative phase difference between the two output signals 715 and 735 (phase modified height audio signals) is shown in FIG. 13*e*. The phase difference shows a 180 degree combined phase shift for each of the frequency bands that are predominantly out-of-phase for each listening position. Thus, out-of-phase frequency bands become predominantly in phase at the listening positions. FIG. 13*e* shows that the relative phase of the two height audio signals has been modified by adding 180 degrees shift to the relative phase between the two height audio signals for each frequency band in which the phase differences are predominantly out of phase (e.g. in the frequency bands 250-750 Hz, 1250-1750 Hz, etc.). This is equivalent to shift the phase of one of the two height audio signals by +90 degrees and the phase of the other height audio signal by −90 degrees in the frequency bands where the phase differences are predominantly out of the phase (see FIG. 13*c* and FIG. 13*d*). The resulting corrected IDP for the left listening position and for the right listening position (shown in FIG. 7*a*) is shown in FIGS. 13*f* and 13*g*. The resulting IDP observed ideally is within plus/minus 90 degrees for both the left and right listening positions.

Therefore, once the FIR of FIG. 12*a* and FIG. 12*b* are applied to the two height audio channels, the resulting IDP observed at the listening position ideally is within plus/minus 90 degrees for both listeners at the respective listening positions, e.g. in the same row of a vehicle (as shown in FIG. 7*a*).

Example Computing Device

A method of processing audio in an immersive audio format comprising at least one height audio channel, for playing back the audio with a non-immersive loudspeaker system of at least two audio loudspeakers in a listening environment including one or more listening positions has been described. Additionally, the present disclosure also relates to an apparatus for carrying out these methods.

Figure 14:
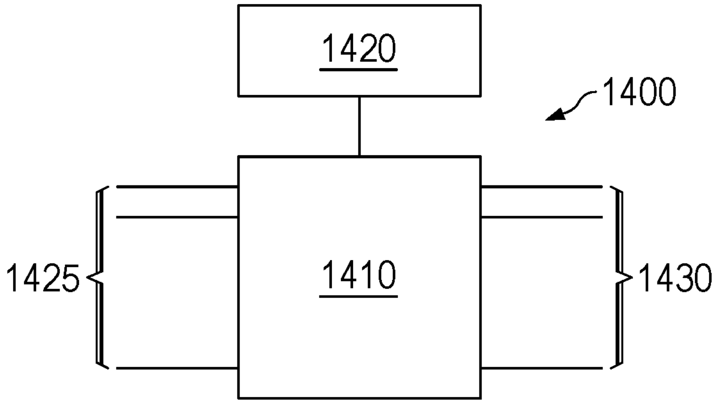
FIG. 14 is a schematic illustration of an example of an apparatus for carrying out methods according to embodiments of the disclosure.

Furthermore, the present disclosure relates to a vehicle which may comprise an apparatus for carrying out these methods. An example of such apparatus 1400 is schematically illustrated in FIG. 14. The apparatus 1400 may comprise a processor 1410 (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory 1420 coupled to the processor 1410. Memory 1420 may for example store an (or a set of) analytical function(s) or a (or a set of) look up table(s) representing the phase differences of the two height audio signals, e.g. for different listening positions and/or listening environment. The processor may be configured to carry out some or all of the steps of the methods described throughout the disclosure, e.g. by retrieving the set of analytical functions and/or LTUs from memory 1420. To carry out the method of processing audio, the apparatus 1400 may receive, as inputs, channels of (e.g. rendered) audio in an immersive audio format, e.g. an height channel and one or more front or surround audio channels 1425. In this case, apparatus 1400 may output two or more audio phase modified audio signal 1430 for playback of the audio in a non-immersive loudspeaker system.

The apparatus 1400 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, while only a single apparatus 1400 is illustrated in FIG. 14, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Embodiments described herein may be implemented in hardware, software, firmware and combinations thereof. For example, embodiments may be implemented on a system comprising electronic circuitry and components, such a computer system. Examples of computer systems include desktop computer systems, portable computer systems (e.g. laptops), handheld devices (e.g. smartphones or tablets) and networking devices. Systems for implementing the embodiments may for example comprise at least one of an integrated circuit (IC), a programmable logic device (PLD) such as a field programmable gate array (FPGA), a digital signal processor (DSP), an application specific IC (ASIC), a central processing unit (CPU), and a graphics processing unit (GPU).

Certain implementations of embodiments described herein may comprise a computer program product comprising instructions which, when executed by a data processing system, cause the data processing system to perform a method of any of the embodiments described herein. The computer program product may comprise a non-transitory medium storing said instructions, e.g. physical media such as magnetic data storage media including floppy diskettes and hard disk drives, optical data storage media including CD ROMs and DVDs, and electronic data storage media including ROMs, flash memory such as flash RAM or a USB flash drive. In another example, the computer program product comprises a data stream comprising said instructions, or a file comprising said instructions stored in a distributed computing system, e.g. in one or more data centers.

The present disclosure is not restricted to the embodiments and examples described above. Numerous modifications and variations can be made without departing from the scope of the present disclosure, defined by the accompanying claims.

Various aspects of the present invention may be appreciated from the following enumerated example embodiments (EEEs):

EEE1. A method (200) of processing audio in an immersive audio format comprising at least one height audio channel, for playing back the processed audio with a non-immersive loudspeaker system of at least two audio loudspeakers in a listening environment including one or more listening positions, wherein each of the one or more listening positions is symmetrically off-center with respect to the at least two loudspeakers and each of the at least two loudspeakers is laterally spaced with respect to each of said one or more listening positions such that, when two monaural audio signals are emanated from the at least two loudspeakers, phase differences occur at the one or more listening positions as a result of acoustic characteristics of the listening environment, the method comprising:

obtaining (250) two height audio signals from at least a portion of the at least one height audio channel;

modifying (270) a relative phase between the two height audio signals in frequency bands in which the phase differences are predominantly out of phase to obtain two phase modified height audio signals in which the phase differences are predominantly in-phase; and playing back (290) the processed audio at the at least two audio loudspeakers, wherein the processed audio comprises the two phase modified height audio signals.

EEE2. The method (200) of EEE1, wherein the audio in the immersive audio format further comprises at least two audio channels and wherein the method further comprises mixing (280) each of the two phase modified height audio signals with each of the two audio channels.

EEE3. The method of EEE1 or EEE2, wherein the audio in the immersive audio format further comprises a center channel and wherein the method further comprises mixing (285) each of the two phase modified height audio signals with the center channel.

EEE4. The method of any of the previous EEE, wherein the audio in the immersive audio format has a single height audio channel, and wherein obtaining (250) the two height audio signals comprises obtaining (255) two identical height audio signals both corresponding to the single height audio channel.

EEE5. The method of any of the previous EEEs, wherein the audio in the immersive audio format comprises at least two height audio channels, and wherein obtaining (250) the two height audio signals comprises obtaining (240) two identical height audio signals from the at least two height audio channels.

EEE6. The method of EEE 5, further comprising applying (242) mid/side processing to the at least two height audio channels to obtain a mid signal and a side signal, wherein each of the two height audio signals corresponds to the mid signal.

EEE7. The method of EEE 6, further comprising mixing (244) the side signal and a signal corresponding to the side signal but with opposite phase of the side signal, with the phase modified height audio signals.

EEE8. The method of any one of the previous EEEs, wherein modifying (270) a relative phase between the two height audio signals comprises measuring (275) said phase differences at the one or more of the listening positions.

EEE9. The method of any one of the previous EEEs, wherein modifying (270) a relative phase between the two height audio signals is based on a predetermined absolute distances between the one or more listening positions and each of the at least two loudspeakers.

EEE10. The method of any one of the previous EEEs, wherein the step of modifying (270) a relative phase between the two height audio signal is triggered upon detection of a movement of a listener at the one or more listening positions.

EEE11. The method of any one of the previous EEEs, wherein the listening environment is the interior of a vehicle.

EEE12. The method of any one of the previous EEEs, wherein the non-immersive loudspeaker system is a stereo or surround loudspeaker system.

EEE13. The method of any one of the previous EEEs, wherein the audio in the immersive audio format is audio rendered in the immersive audio format.

EEE14. The method of any one of the previous EEEs, wherein the immersive audio format is Dolby Atmos, or any X.Y.Z audio format where $X \geq 2$ is the number of front or surround audio channels, $Y \geq 0$ is, when present, a Low Frequency Effects or subwoofer audio channel, and $Z \geq 1$ is the at least one height audio channel.

EEE15. The method according to any one of the previous EEEs wherein said modifying (270) adds a 180 degree phase shift to the relative phase between the two height audio signals for each frequency band in which the phase differences are predominantly out of phase.

EEE16. The method according to EEE 15, wherein the phase of one of the two height audio signals is shifted by +90 degrees and the phase of the other one of the two height audio signals is shifted by −90 degrees.

EEE17. An apparatus comprising a processor and a memory coupled to the processor, wherein the processor is configured to carry out the method according to any one of the previous EEEs.

EEE18. A vehicle comprising the apparatus of EEE 17.

EEE19. A program comprising instructions that, when executed by a processor, cause the processor to carry out the method according to any one of the EEEs 1-16.

EEE20. A computer-readable storage medium storing the program according to EEE 19.

The invention claimed is:

1. A method of processing audio in an immersive audio format comprising at least one height audio channel, for playing back the processed audio with a non-immersive loudspeaker system of at least two audio loudspeakers without overhead loudspeakers, in a listening environment including two or more listening positions, wherein each of the two or more listening positions is symmetrically off-center with respect to an elevation plane that is perpendicular to a plane in which the at least two loudspeakers reside, such that each of the two or more listening positions is equidistant from the elevation plane, and each of the at least two loudspeakers is laterally spaced with respect to each of said two or more listening positions such that, when two monaural audio signals are emanated from the at least two loudspeakers, inter-loudspeaker differential phases, IDPs, occur at the two or more listening positions as a result of acoustic characteristics of the listening environment, the method comprising:

obtaining two monoaural height audio signals from at least a portion of the at least one height audio channel;

modifying a relative phase between the two monaural height audio signals in frequency bands in which the IDPs occurring at the two or more listening positions when the two height channels are emanated from the at least two loudspeakers, are out of phase, to obtain two phase modified height audio signals in which the IDPs are in-phase; and playing back the processed audio at the at least two audio loudspeakers, wherein the processed audio comprises the two phase modified height audio signals and wherein phase modification of the two monaural height audio signals causes a perception of sound height when played back by the non-immersive loudspeaker system without overhead loudspeakers.

2. The method of claim 1, wherein the audio in the immersive audio format further comprises at least two audio channels and wherein the method further comprises mixing each of the two phase modified height audio signals with one of the two audio channels.

3. The method of claim 1, wherein the audio in the immersive audio format further comprises a center channel and wherein the method further comprises mixing each of the two phase modified height audio signals with the center channel.

4. The method of claim 1, wherein the audio in the immersive audio format has a single height audio channel, and wherein obtaining the two monaural height audio signals comprises obtaining the two monaural height audio signals both corresponding to the single height audio channel.

5. The method of claim 1, wherein the audio in the immersive audio format comprises at least two height audio channels, and wherein obtaining the two monaural height audio signals comprises obtaining the two monaural height audio signals from the at least two height audio channels.

6. The method of claim 5, further comprising applying mid/side processing to the at least two height audio channels to obtain a mid signal and a side signal, wherein each of the two height audio signals corresponds to the mid signal.

7. The method of claim 6, further comprising mixing the side signal and a signal corresponding to the side signal but with opposite phase of the side signal, with the phase modified height audio signals.

8. The method of claim 1, wherein modifying a relative phase between the two height audio signals comprises measuring said IDPs at the one or more of the listening positions.

9. The method of claim 1, wherein modifying a relative phase between the two height audio signals is based on a predetermined absolute distances between the one or more listening positions and each of the at least two loudspeakers.

10. The method of claim 1, wherein the step of modifying a relative phase between the two height audio signal is triggered upon detection of a movement of a listener at the one or more listening positions.

11. The method of claim 1, wherein the listening environment is the interior of a vehicle.

12. The method of claim 1, wherein the non-immersive loudspeaker system is a stereo or surround loudspeaker system.

13. The method of claim 1, wherein the audio in the immersive audio format is audio rendered in the immersive audio format and/or wherein the immersive audio format is Dolby Atmos, or any X.Y.Z audio format where X≥2 is the number of front or surround audio channels, Y≥0 is, when present, a Low Frequency Effects or subwoofer audio channel, and Z≥1 is the at least one height audio channel.

14. The method according to claim 1, wherein said modifying adds a 180 degree phase shift to the relative phase between the two height audio signals for each frequency band in which the IDPs are out of phase.

15. The method according to claim 14, wherein the phase of one of the two height audio signals is shifted by +90 degrees and the phase of the other one of the two height audio signals is shifted by −90 degrees.

16. The method of claim 1, wherein the phase modification of the two monaural height audio signals causes the two monaural height audio signals to be virtually centered.

17. An apparatus comprising:

a processor; and a memory coupled to the processor, wherein the memory stores instructions that, when executed by the processor, cause the processor to process audio in an immersive audio format comprising at least one height audio channel, for playing back the processed audio with a non-immersive loudspeaker system of at least two audio loudspeakers without overhead loudspeakers, in a listening environment including two or more listening positions, wherein each of the two or more listening positions is symmetrically off-center with respect to an elevation plane that is perpendicular to a plane in the at least two loudspeakers reside, such that each of the two or more listening positions is equidistant from the elevation plane, and each of the at least two loudspeakers is laterally spaced with respect to each of said two or more listening positions such that, when two monaural audio signals are emanated from the at least two loudspeakers, inter-loudspeaker differential phases, IDPs, occur at the two or more listening positions as a result of acoustic characteristics of the listening environment, wherein processing the audio comprises:

obtaining two monoaural height audio signals from at least a portion of the at least one height audio channel;

modifying a relative phase between the two monaural height audio signals in frequency bands in which the IDPs occurring at the two or more listening positions when the two height channels are emanated from the at least two loudspeakers, are out of phase, to obtain two phase modified height audio signals in which the IDPs are in-phase; and providing the processed audio for playback at the at least two audio loudspeakers, wherein the processed audio comprises the two phase modified height audio signals and wherein phase modification of the two monaural height audio signals causes a perception of sound height when played back by the non-immersive loudspeaker system without overhead loudspeakers.

18. A vehicle comprising the apparatus of claim 17.

19. A computer-readable and non-transitory storage medium storing instructions that, when executed by a processor, cause the processor to process audio in an immersive audio format comprising at least one height audio channel, for playing back the processed audio with a non-immersive loudspeaker system of at least two audio loudspeakers without overhead loudspeakers, in a listening environment including two or more listening positions, wherein each of the two or more listening positions is symmetrically off-center with respect to an elevation plane that is perpendicular to a plane in the at least two loudspeakers reside, such that each of the two or more listening positions is equidistant from the elevation plane, and each of the at least two loudspeakers is laterally spaced with respect to each of said two or more listening positions such that, when two monaural audio signals are emanated from the at least two loudspeakers, inter-loudspeaker differential phases, IDPs, occur at the two or more listening positions as a result of acoustic characteristics of the listening environment, wherein processing the audio comprises:

obtaining two monoaural height audio signals from at least a portion of the at least one height audio channel;

modifying a relative phase between the two monaural height audio signals in frequency bands in which the IDPs occurring at the two or more listening positions when the two height channels are emanated from the at least two loudspeakers, are out of phase, to obtain two phase modified height audio signals in which the IDPs are in-phase; and providing the processed audio for playback at the at least two audio loudspeakers, wherein the processed audio comprises the two phase modified height audio signals and wherein phase modification of the two monaural height audio signals causes a perception of sound height when played back by the non-immersive loudspeaker system without overhead loudspeakers.

* * * * *